(12) United States Patent
Nagasaki et al.

(10) Patent No.: US 10,838,154 B2
(45) Date of Patent: Nov. 17, 2020

(54) OPTICAL FIBER CABLE, AND OPTICAL CONNECTOR CABLE

(71) Applicant: SUMITOMO ELECTRIC INDUSTRIES, LTD., Osaka (JP)

(72) Inventors: Taisuke Nagasaki, Osaka (JP); Takeshi Inoue, Osaka (JP); Toshihisa Yokochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/161,273

(22) Filed: Oct. 16, 2018

(65) Prior Publication Data

US 2019/0121034 A1  Apr. 25, 2019

(30) Foreign Application Priority Data

Oct. 19, 2017 (JP) ................. 2017-202952

(51) Int. Cl.
*G02B 6/38* (2006.01)
*G02B 6/36* (2006.01)
*H01R 13/66* (2006.01)
*F21V 8/00* (2006.01)
*G02B 6/42* (2006.01)

(52) U.S. Cl.
CPC .......... *G02B 6/3838* (2013.01); *G02B 6/003* (2013.01); *G02B 6/3696* (2013.01); *G02B 6/3873* (2013.01); *G02B 6/428* (2013.01); *G02B 6/4292* (2013.01); *H01R 13/6658* (2013.01); *G02B 6/3636* (2013.01); *G02B 6/3668* (2013.01); *G02B 6/4214* (2013.01); *G02B 6/4249* (2013.01)

(58) Field of Classification Search
CPC .................................................... G02B 6/368
See application file for complete search history.

(56) References Cited

U.S. PATENT DOCUMENTS 4,148,559 A * 4/1979 Gauthier ............. G02B 6/3805
  385/55
5,446,810 A * 8/1995 Watanabe ........... G02B 6/3676
  385/137

(Continued)

FOREIGN PATENT DOCUMENTS

| JP | 2013-083946 A | 5/2013 |
| JP | 2014-216176 A | 11/2014 |

*Primary Examiner* — Rhonda S Peace
(74) *Attorney, Agent, or Firm* — Faegre Drinker Biddle & Reath LLP

(57) ABSTRACT

An optical fiber cable is disclosed. The optical fiber cable comprises an optical cable including optical fibers and a sheath where the optical fibers are arranged in a first array, and a holder. The optical fibers have first extending parts that extend outside from the sheath, and second extending parts that extends from the first extending parts to the tips of the optical fibers. The holder comprises a first portion that houses therein transition portions where the first extending parts transitions from the first array to a second array, and a second portion that holds parts of the first extending parts in the second array. The second portion is configured to hold the first extending parts in a manner such that a mutual positional relationship among the second extending parts keeps the same state as a mutual positional relationship among the first extending parts at the second portion.

19 Claims, 20 Drawing Sheets

(56) References Cited

U.S. PATENT DOCUMENTS

| | | | | |
|---|---|---|---|---|
| 6,045,269 A * | 4/2000 | Watanabe | G02B 6/29368 | 385/59 |
| 6,299,361 B1 * | 10/2001 | Sasaki | G02B 6/3636 | 385/58 |
| 6,321,019 B1 * | 11/2001 | Shibuya | G02B 6/3834 | 385/115 |
| 6,345,916 B1 * | 2/2002 | Yui | G02B 6/3652 | 385/147 |
| 6,498,882 B1 * | 12/2002 | Buckelew | G02B 6/3636 | 385/114 |
| 6,614,971 B2 * | 9/2003 | Sun | G02B 6/368 | 385/114 |
| 6,873,770 B2 * | 3/2005 | Leung | G02B 6/3636 | 385/137 |
| 6,931,195 B2 * | 8/2005 | Lemoff | G02B 6/4249 | 385/114 |
| 7,373,053 B2 * | 5/2008 | Takahashi | G02B 6/368 | 385/137 |
| 7,588,374 B2 * | 9/2009 | Nishimura | G02B 6/3835 | 385/60 |
| 8,727,634 B2 * | 5/2014 | Sasaki | G02B 6/3865 | 385/59 |
| 8,985,874 B2 * | 3/2015 | Isenhour | G02B 6/42 | 385/93 |
| 9,033,592 B2 * | 5/2015 | Arao | G02B 6/43 | 385/59 |
| 9,778,427 B2 * | 10/2017 | Isenhour | G02B 6/4284 | |
| 9,921,380 B2 * | 3/2018 | Goddard | G02B 6/4404 | |
| 2002/0076190 A1 * | 6/2002 | Matsumoto | G02B 6/30 | 385/137 |
| 2003/0174971 A1 * | 9/2003 | Shigenaga | G02B 6/3834 | 385/71 |
| 2003/0223707 A1 * | 12/2003 | Nakanishi | G02B 6/3636 | 385/92 |
| 2014/0294353 A1 | 10/2014 | Ertel | | |
| 2015/0016795 A1 * | 1/2015 | Sasaoka | G02B 6/02042 | 385/126 |
| 2015/0043871 A1 * | 2/2015 | Mitose | G02B 6/3885 | 385/76 |
| 2019/0121034 A1 * | 4/2019 | Nagasaki | G02B 6/3838 | |
| 2019/0129106 A1 * | 5/2019 | Inoue | G02B 6/4206 | |

* cited by examiner

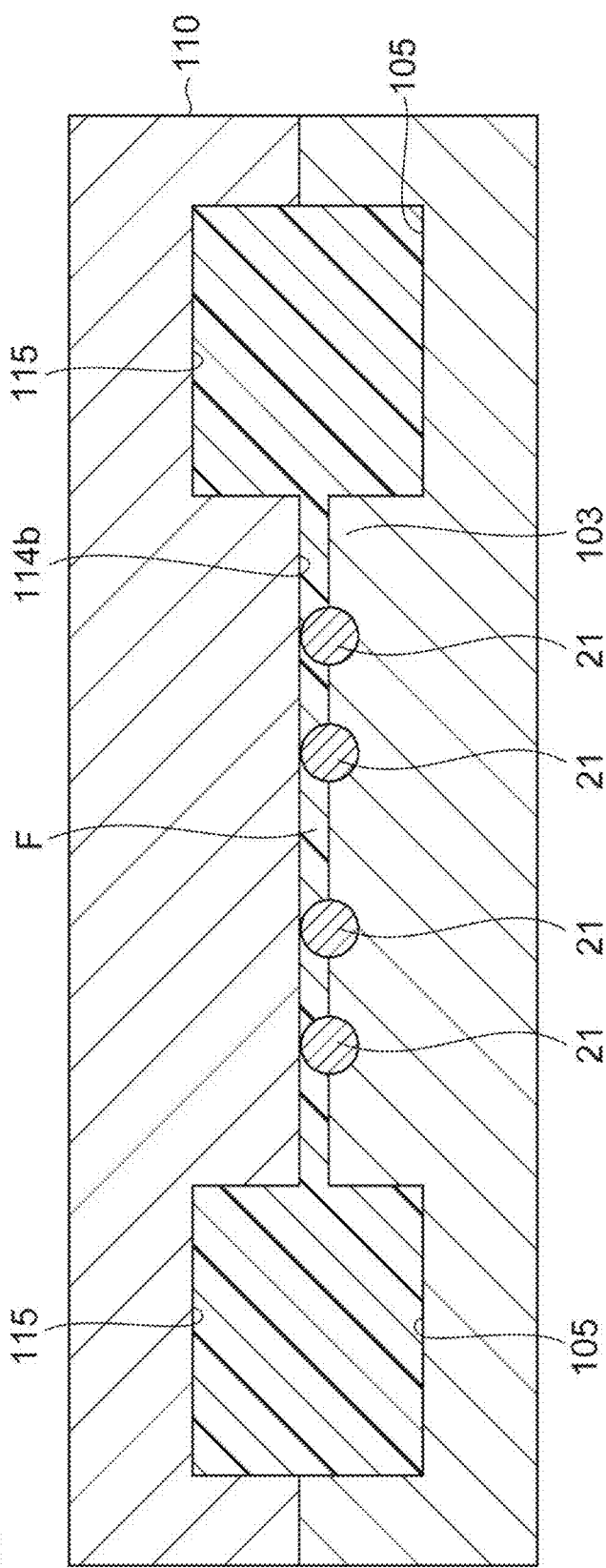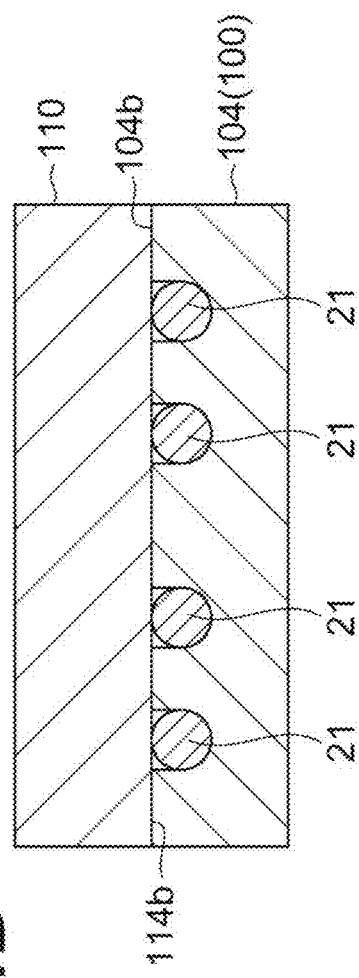

OPTICAL FIBER CABLE, AND OPTICAL CONNECTOR CABLE

CROSS REFERENCE TO RELATED APPLICATION

The present application is based on and claims the benefit of priority of Japanese Patent Application No. 2017-202952, filed on Oct. 19, 2017, the entire content of which is incorporated herein by reference.

TECHNICAL FIELD

The present disclosure relates to an optical fiber cable, an optical connector cable, and a method for manufacturing an optical fiber cable.

BACKGROUND

U.S. patent application publication No. US2014/0294353 discloses an optical cable assembly comprising an optical cable having a plurality of optical fibers and a subassembly to which the optical cable is attached. The optical cable assembly is configured, with each optical fiber of the optical cable being placed at a predetermined pitch on a light reflector arranged on a circuit board, in a manner that each active device (optical elements) and each optical fiber are optically coupled. Japanese Unexamined Patent Publication No. JP2014-216176 and Japanese Unexamined Patent Publication No. JP2013-083946 disclose examples of an optical cable having a plurality of optical fibers.

SUMMARY

The present disclosure provides an optical fiber cable. The optical fiber cable comprises an optical cable including a plurality of optical fibers and a sheath surrounding the plurality of optical fibers, and a holder arranged in the vicinity of one end of the sheath. The plurality of optical fibers is arranged in a first array within the sheath. The plurality of optical fibers has first extending parts that respectively extend outside from one end of the sheath, and second extending parts that respectively extends from one ends of the first extending parts to the tips of the optical fibers. The holder comprises a first portion that houses therein transition portions of the first extending parts where the first extending parts transitions from the first array to a second array different from the first array, and a second portion that holds parts of the first extending parts in the second array. The second portion is configured to hold the first extending parts in a manner that a mutual positional relationship among the second extending parts keeps the same state as a mutual positional relationship among the first extending parts at the second portion.

The present disclosure also provides an optical connector cable. The optical connector cable comprises a circuit board, a photoelectric conversion device arranged on the circuit board, the optical fiber cable, and a lens member configured to install the second extending parts thereon. The lens member optically couples the plurality of the optical fibers with the photoelectric conversion device.

BRIEF DESCRIPTION OF THE DRAWINGS

The foregoing and other purposes, aspects and advantages will be better understood from the following detailed description of embodiments of the invention with reference to the drawings, in which:

FIG. 11A is a cross-sectional view along a XIa-XIa line in FIG. 10;

FIG. 11B is a cross-sectional view along a XIb-XIb line in FIG. 10;

DETAILED DESCRIPTION

Figure 1A:
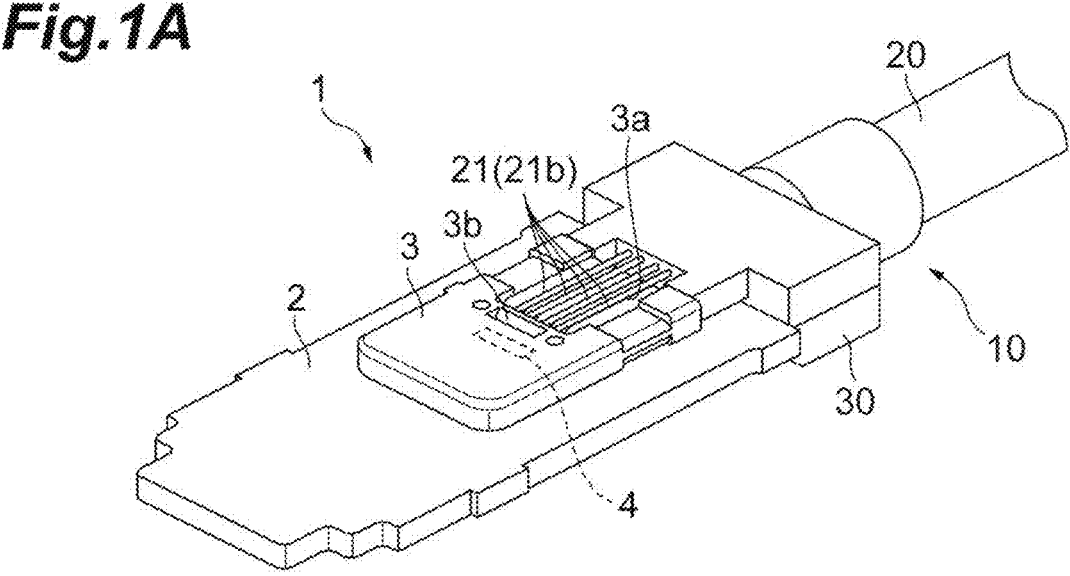
FIG. 1A is a perspective view showing one embodiment of an optical connector cable.

Problem to be Solved by the Present Disclosure

In the optical cable assembly described in US2014/0294353, it is necessary to, in order to install each optical fiber on the light reflector, attach the optical fibers after lining up each optical fiber in a groove pitch of the light reflector. However, an optical fiber is difficult to keep bent in comparison with an electrical signal line having a copper core wire. Therefore, during a period until finally fixing an optical fiber with adhesive after installing the optical fiber into a groove of a light reflector, the optical fiber may come out of the groove, or its position may be displaced. If the optical fiber is fixed with its position displaced from a predetermined position as described above, optical coupling efficiency between an optical device and the optical fiber is not stable. On the other hand, if it is attempted to perform line arrangement by forcingly bending an optical fiber, the optical fiber is excessively stressed and may be broken. That "optical coupling efficiency is not stable" stated here means that an optical fiber to be coupled with an optical device with optical coupling efficiency significantly deteriorates relative to optical coupling efficiency obtained in a case where the optical fiber is fixed at an optimal position occurs.

Effect of the Present Disclosure

According to an optical fiber cable and an optical connector cable according to the present disclosure, it is possible to stabilize optical coupling efficiency between an optical device and optical fibers.

DESCRIPTION OF EMBODIMENTS OF THE INVENTION

Embodiments of the present invention will be enumerated and described. An optical fiber cable according to one aspect of the present disclosure comprises an optical cable including a plurality of optical fibers and a sheath surrounding the plurality of optical fibers, and a holder arranged in the vicinity of one end of the sheath. The plurality of optical fibers is arranged in a first array within the sheath. The plurality of optical fibers has first extending parts that respectively extend outside from one end of the sheath, and second extending parts that respectively extends from one ends of the first extending parts to the tips of the optical fibers. The holder comprises a first portion that houses therein transition portions of the first extending parts where the first extending parts transitions from the first array to a second array different from the first array, and a second portion that holds parts of the first extending parts in the second array. The second portion is configured to hold the first extending parts in a manner that a mutual positional relationship among the second extending parts keeps the same state as a mutual positional relationship among the first extending parts at the second portion.

The optical fiber cable comprises a holder that houses therein the first extending parts of the optical fibers and holds at least a part thereof. The second portion of the holder is configured to hold the first extending parts of the optical fibers in a manner that a mutual positional relationship among the second extending parts keeps the same state as a mutual positional relationship among the first extending parts in the second portion. Since a configuration holding the first extending parts with the holder determines the mutual positional relationship among the optical fibers (the second extending parts) so as to be a desired positional relationship in advance, it is possible to, at the time of attaching a tip part of each optical fiber to other member (the lens member and the like), easily perform lined-up arrangement of the optical fibers. As a result, it is possible to stabilize optical coupling efficiency between each optical fiber and the other member (the optical device, the lens member or the like). Further, since the holder determines the mutual positional relationship among the optical fibers (the second extending parts) in advance, it is also possible to easily realize automation of work of attaching the optical fiber cable to other member.

In one embodiment of the optical fiber cable, the second portion may hold the first extending parts in a manner that the second extending parts are mutually parallel. A member to which each optical fiber of the optical fiber cable is to be attached (e.g. the lens member) is often designed so that areas (e.g. grooves) to which optical fibers are attached are parallel. By the optical fibers corresponding to the second extending parts being held in a manner of being mutually parallel, attachment to such a member can be easily realized.

In one embodiment of the optical fiber cable, the first array may be a two-dimensional array. This embodiment arranges the optical fibers more equally in the optical cable, and does not necessitate optical fibers with a diameter larger than necessary, thereby can downsize the optical fiber cable.

In one embodiment of the optical fiber cable, the second array may be a one-dimensional array. This embodiment enables fiber attaching areas on a member (e.g. the lens member) to which each optical fiber is to be attached to be continuously formed in one direction, thereby this embodiment makes processing of the fiber attaching areas easy. Further, since it is also possible to make the attaching areas thin, this embodiment can reduce a thickness of a product.

In one embodiment of the optical fiber cable, a fiber-to-fiber pitch of the plurality of the optical fibers in the second array may be wider than a fiber-to-fiber pitch in the first array. This embodiment provides degrees of freedom to designs of other member (the lens member, the circuit board or the like).

In one embodiment of the optical fiber cable, a center of gravity of the plurality of optical fibers in the second array may be displaced relative to a center of gravity in the first array in an extension direction of the plurality of optical fibers. When the center of gravity of the optical fibers in the second array is caused to correspond to the center of gravity in the first array, it can be easily performed to cause the optical fibers to transition from the first array to the second array. On the other hand, a member (e.g. the lens member) on which the optical fibers of the optical cable are to be placed is often provided on the circuit board, and, if the configuration of causing the center of gravity in the second array and the center of gravity in the first array to correspond is adopted in this case, a positional relationship between the circuit board and the optical cable is vertically displaced. Thus, an imbalanced configuration may occur, or thinning of parts may be hindered. Therefore, by adopting the above configuration, attachment to such a member can be realized more easily.

In one embodiment of the optical fiber cable, the second portion may cover partial outer circumferences of the first extending parts in the second array. Since it is possible to visually confirm a mutual positional relationship among the first extending parts, this embodiment makes it possible to easily judge quality of an optical fiber cable.

In one embodiment of the optical fiber cable, the second portion may cover whole outer circumferences of the first extending parts in the second array. Since the whole outer circumferences are covered, the embodiment makes it possible to prevent the first extending parts from coming out of the second portion more certainly and maintain the mutual positional relationship among the second extending parts over a long time.

In one embodiment of the optical fiber cable, the first portion may be provided with an opening in an area close to the second portion, at least parts of the first extending parts being exposed in the opening. Because it is possible to easily visually confirm a state of the optical fibers in the first portion (for example, a mutual positional relationship), this embodiment makes it possible to easily judge quality of an optical fiber cable. In this embodiment, the first extending parts may be mutually parallel in the opening.

In one embodiment of the optical fiber cable, the holder may comprise a positioning mechanism configured to position the optical fiber cable relative to other member, and the positioning mechanism may project from one end of the holder along an extension direction of the plurality of optical fibers. The embodiment realizes positioning of the optical fiber cable to other member by simple means. In this embodiment, the positioning mechanism may include a pair of projections between which the first extending portions or the second extending portions are located. A thickness of the positioning mechanism may be thinner than a thickness of the first portion or the second portion.

In one embodiment of the optical fiber cable, the holder may be a resin molded member and may be in close contact with the plurality of optical fibers in the first portion and the second portion. This embodiment causes the optical fibers in the first portion and the second portion to be more certainly fixed by the close contact and prevents the positional relationship among the optical fibers from varying with time.

As further embodiments of the optical fiber cable, the first portion may include a cylindrical portion and the second portion may include an approximate rectangular parallelepiped portion. The holder may cover the one end of the sheath. An each length of the first extending parts may be 5 mm to 15 mm, and an each length of the second extending parts may be 3 mm to 10 mm. The second portion may include a plate in which ends of the first extending portion are partially buried.

An optical connector cable according to one aspect of the present disclosure comprises a circuit board, a photoelectric conversion device arranged on the circuit board, the optical fiber cable according to any of the above embodiments, and a lens member configured to install the second extending parts thereon. The lens member optically couples the plurality of the optical fibers with the photoelectric conversion device. This aspect causes optical coupling efficiency between each optical fiber and the lens member or the photoelectric conversion device to be stable similarly to the above. Further, this aspect easily realizes automation of the work of attaching the optical fiber cable to the lens member.

A method for manufacturing an optical fiber cable according to an aspect of the present disclosure comprises (a) providing an optical cable having a plurality of optical fibers and a sheath surrounding the plurality of optical fibers, the plurality of optical fibers being arranged in a first array within the sheath, wherein the plurality of optical fibers have first extending parts that respectively extend outside from one end of the sheath, and second extending parts that respectively extends from one ends of the first extending parts to the tips of the optical fibers; (b) providing a first mold having an arrangement portion configured to arrange the sheath, a transition void corresponding to transition portions of the first extending parts where the first extending parts transitions from the first array to a second array different from the first array, and a holding mechanism configured to hold at least either the first extending parts or the second extending parts in the second array; (c) providing a second mold corresponding to the first mold; (d) installing the optical cable on the first mold in a manner such that the sheath is arranged on the arrangement portion, at least either the first extending parts or the second extending parts are held by the holding mechanism, and the first extending parts transitions from the first array to the second array in the transition void; (e) installing the second mold on the first mold; (f) injecting molten molding resin into the first mold and the second mold to fill a part of the arrangement portion, the transition void and a void adjoining the holding mechanism with the molding resin; and (g) taking out after the injecting an optical fiber cable provided with the optical cable, the molding resin covering at least parts of the first extending parts, from the first mold and the second mold.

In the above method for manufacturing an optical fiber cable, a first mold that has a holding mechanism holding at least either the first extending parts or second extending parts of the optical fibers in the second array is prepared, and the holding mechanism is caused to hold parts of at least either the first extending parts or the second extending parts to injection-mold molding resin. Then, the void adjoining the holding mechanism is filled with the molding resin to make the optical fiber cable. Since the optical fiber cable is made using the holding mechanism that holds at least either the first extending parts or second extending parts of the optical fibers in the second array, this aspect makes it possible to easily make such an optical fiber cable that a mutual positional relationship among optical fibers (the second extending parts) is determined in advance to be a desired relationship in a made optical fiber cable.

An apparatus for manufacturing an optical fiber cable according to an aspect of the present disclosure is a molding apparatus for covering or fixing parts of extending parts of a plurality of optical fibers of an optical cable having the plurality of optical fibers and a sheath surrounding the plurality of optical fibers so that a mutual positional relationship among tip parts of the plurality of optical fibers becomes a desired relationship. In the optical cable used here, the plurality of optical fibers has first extending parts that respectively extend outside from one end of the sheath, and second extending parts that respectively extends from one ends of the first extending parts to the tips of the optical fibers, and the plurality of optical fibers is arranged in a first array within the sheath. This manufacturing apparatus is configured comprising a first mold and a second mold corresponding to the first mold. The first mold has an arrangement portion for arranging the sheath of the optical cable, a transition void corresponding to a transition portions of the first extending parts where the first extending parts transitions from the first array to a second array different from the first array, and a holding mechanism holding at least either the first extending parts or the second extending parts in the second array. The second mold may have a plane in areas corresponding to the transition void and a void adjoining the holding mechanism of the first mold. Further, when the arrangement portion has a semi-cylindrical shape, the second mold may have a similar semi-cylindrical shape in an area corresponding to the arrangement portion of the first mold. Such a manufacturing apparatus can achieve the manufacturing method described above.

DETAILS OF EMBODIMENTS OF THE PRESENT INVENTION

Description will be made on an optical fiber cable and an optical connector cable provided with the optical fiber cable according to embodiments of the present invention with reference to drawings. The present invention is not limited to the examples but shown by the claims, and it is intended that all modifications within meanings and a scope equal to those of the claims are included.

First Embodiment

Figure 1B:
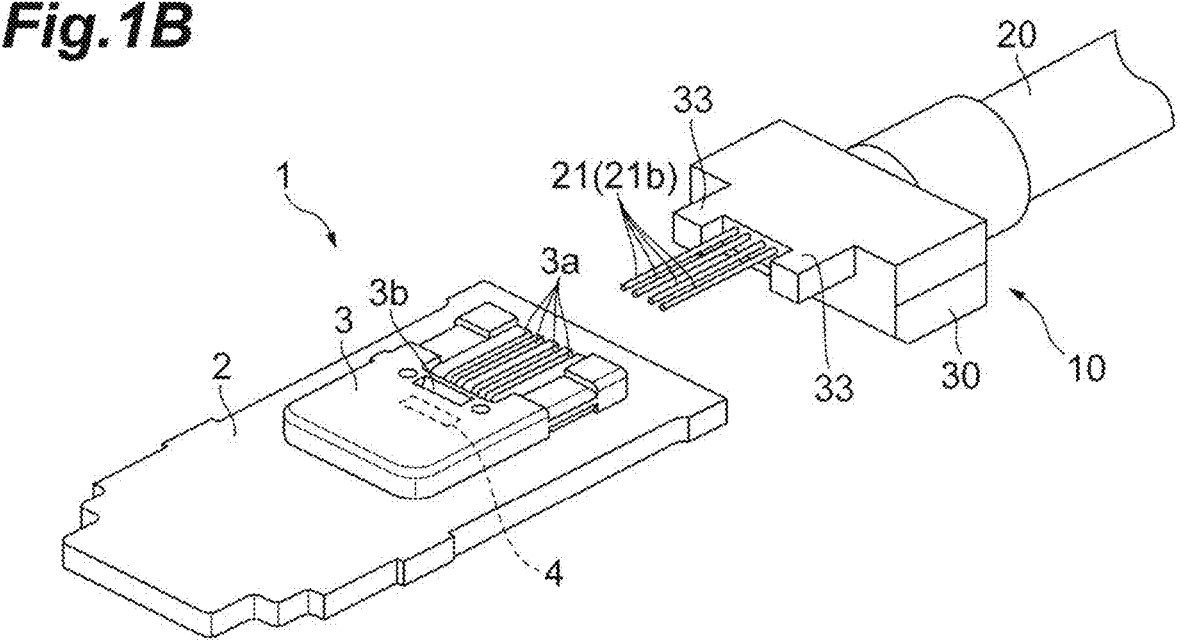
FIG. 1B is a perspective view showing a state of an optical connector cable shown in FIG. 1A before an optical fiber cable is attached to a lens member.

Description will be made on an optical connector cable 1 according to a first embodiment with reference to FIGS. 1A and 1B. FIG. 1A is a perspective view showing the optical connector cable 1 and FIG. 1B is a perspective view showing a state of the optical connector cable 1 before an optical fiber cable is attached to a lens member and a circuit board. As shown in FIGS. 1A and 1B, the optical connector cable 1 includes a circuit board 2, a lens member 3, a photoelectric conversion device 4, and an optical fiber cable 10. The photoelectric conversion device 4 includes a plurality of light emitting elements such as vertical cavity surface emitting lasers (VCSELs), and/or a plurality of light receiving elements such as photodiodes (PDs). The photoelectric conversion device 4 is mounted on the circuit board 2. The lens member 3 is arranged over the photoelectric conversion device 4 in a manner of covering the device 4.

The optical fiber cable 10 is a cable that houses most of optical fibers 21 therein and makes tip parts (second extending parts 21b) of the optical fibers 21 exposed to the outside. In the optical fiber cable 10, fiber pitches among the tip parts of the optical fibers 21 and an extension direction of the optical fibers 21 are determined by a holder 30. In the example shown in FIG. 1A, the tip parts of the optical fibers 21 are lined up in a manner of being mutually parallel. The lined-up tip parts of the optical fibers 21 are placed in grooves 3a provided on a top surface of the lens member 3, respectively, as shown in FIG. 1B. The lens member 3 is configured to convert light from the optical fibers 21 propagating in a horizontal direction to a vertical direction or light from the photoelectric conversion device 4 propagating in the vertical direction to the horizontal direction by a total reflection surface 3b which converts a light propagation direction. The lens member 3 is provided with a lens surface formed on a part facing the photoelectric conversion device 4, and this lens surface optically couples the optical fibers 21 with the photoelectric conversion device 4 mounted on the circuit board 2. Since the lens member 3 propagates light therethrough, the lens member 3 may be partially or wholly made of transparent material through which light can propagate, for example, glass or the like.

Figure 2:
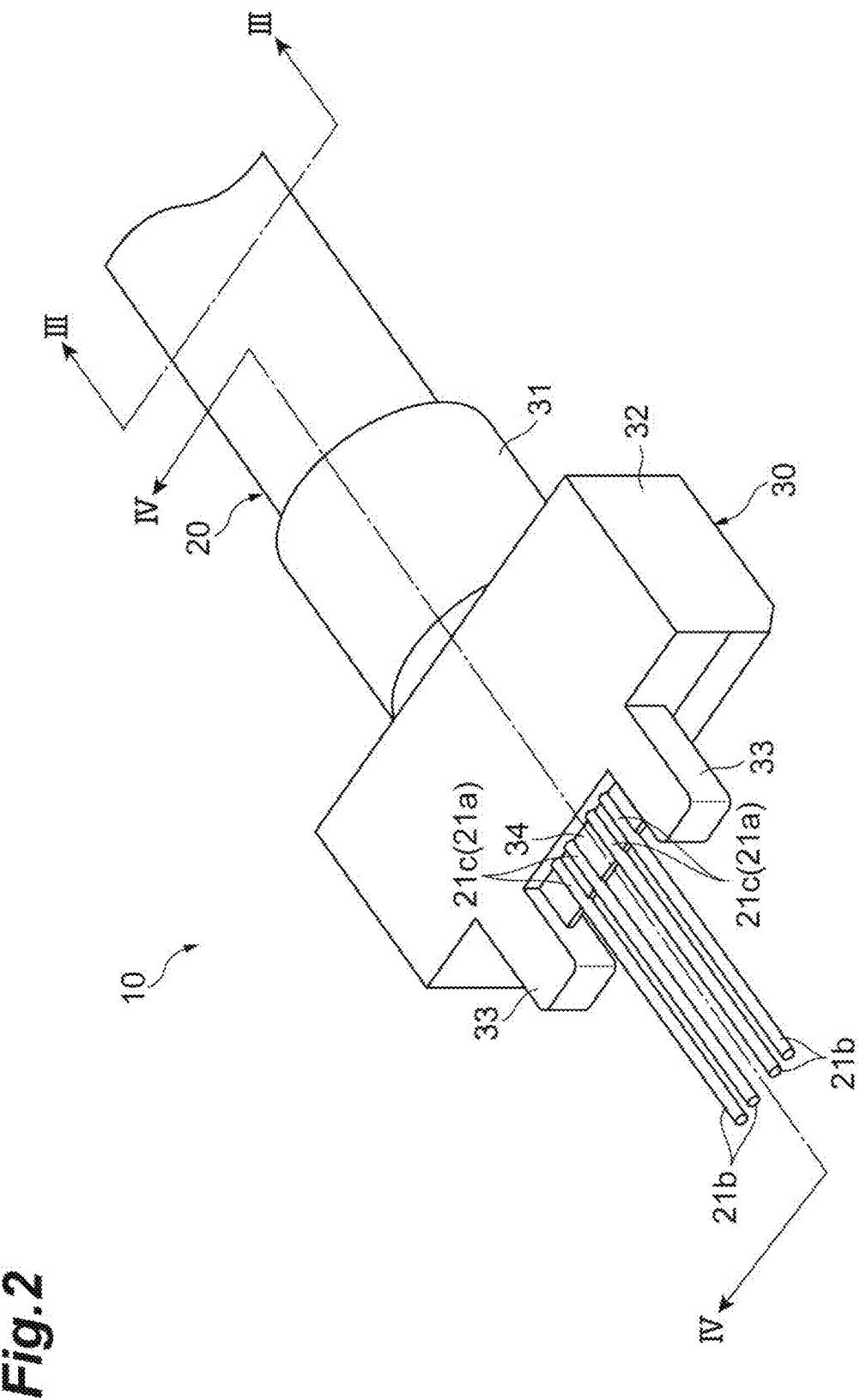
FIG. 2 is a perspective view showing an optical fiber cable according to a first embodiment.
Figure 3:
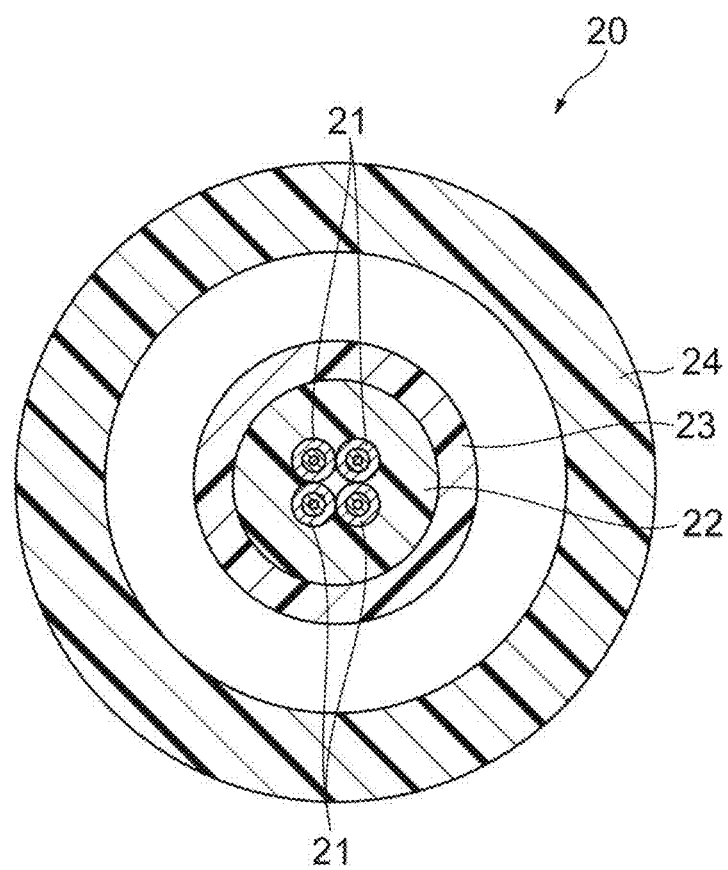
FIG. 3 is a cross-sectional view along a III-III line of the optical fiber cable shown in FIG. 2.
Figure 4:
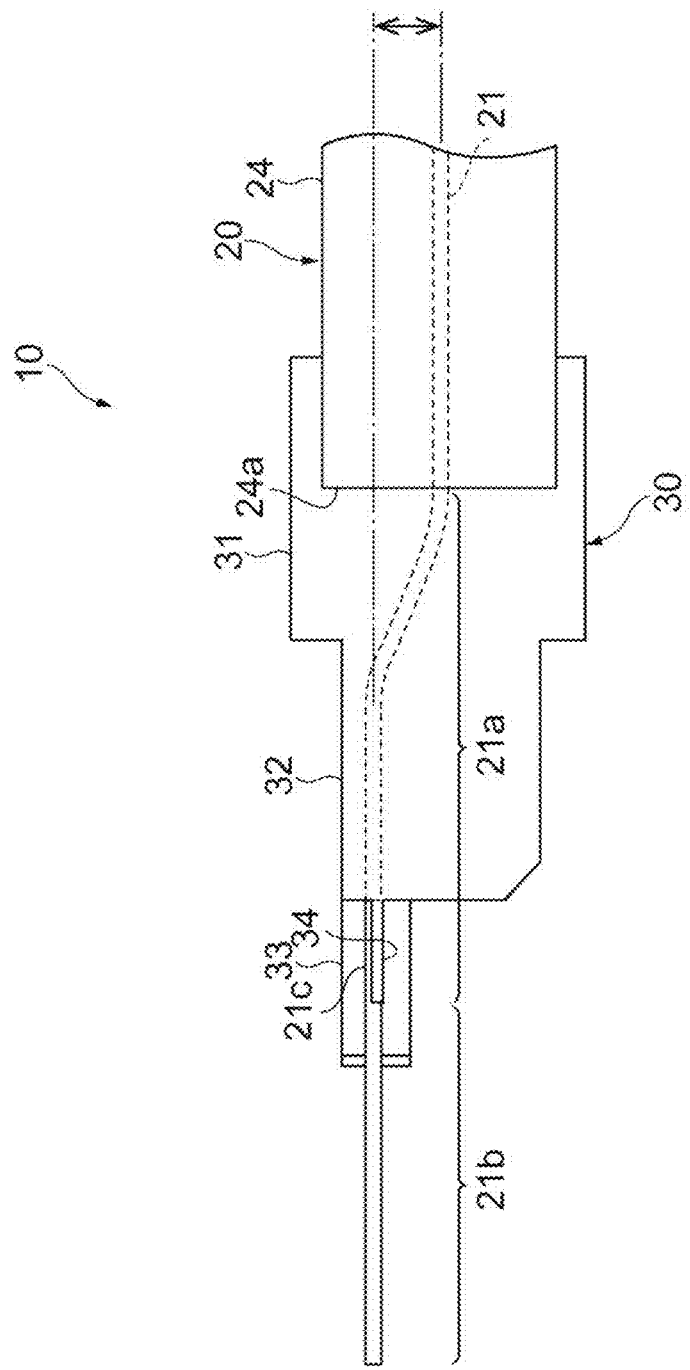
FIG. 4 is a cross-sectional view along a IV-IV line of the optical fiber cable shown in FIG. 2.
Figure 5:
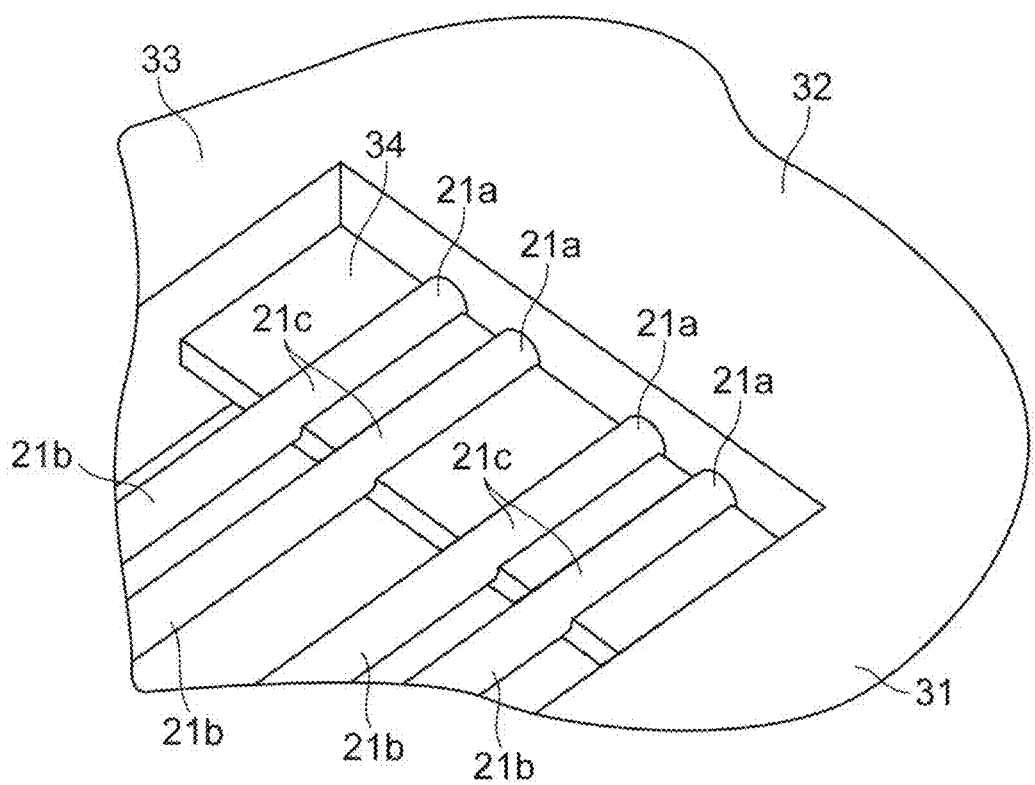
FIG. 5 is a perspective view showing an enlarged holding portion of the optical fiber cable shown in FIG. 2.
Figure 6:
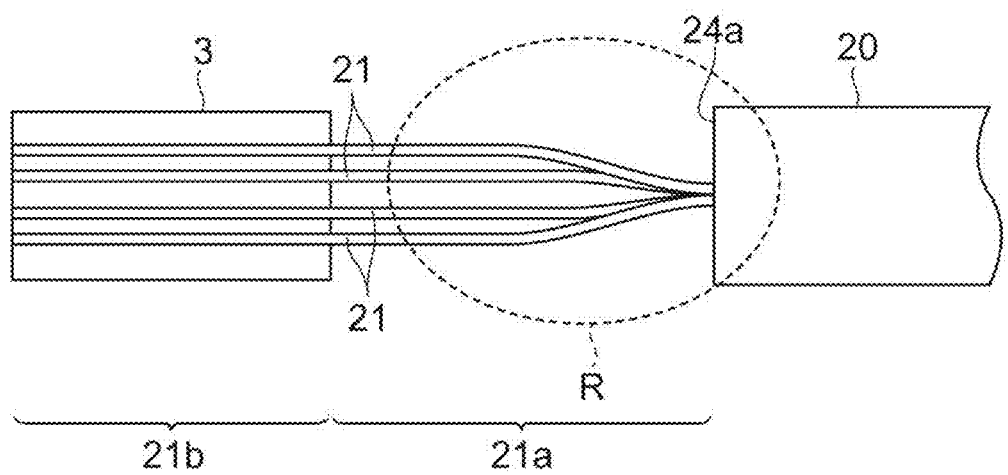
FIG. 6 is a schematic diagram showing a transition state of optical fibers being pitch-converted, heading toward the lens member from an optical cable.

Next, more detailed description will be made on the optical fiber cable 10 with reference to FIGS. 2 to 6. FIG. 2 is a perspective view showing the optical fiber cable 10. FIG. 3 is a cross-sectional view along a III-III line of the optical fiber cable 10 or an optical cable 20 shown in FIG. 2. FIG. 4 is a cross-sectional view along a IV-IV line of the optical fiber cable 10 shown in FIG. 2. FIG. 5 is a partially enlarged perspective view enlargingly showing a holding portion 34 of the optical fiber cable 10. FIG. 6 is a schematic diagram showing a transition state of optical fibers being pitch-converted, heading toward the lens member from an optical cable. As shown in FIG. 2, the optical fiber cable 10 includes the optical cable 20 and the holder 30.

As shown in FIGS. 2 and 3, the optical cable 20 includes the plurality of optical fibers 21 (four optical fibers in this embodiment), tensile strength fibers 22 arranged around the optical fibers 21, a fiber tube 23 fixing the tensile strength fibers 22 to prevent the tensile strength fibers 22 from coming apart, and a cable sheath 24 made of resin. The cable sheath 24 surrounds the optical fibers 21, the fiber tube 23 and the like. The optical cable 20 extends in one direction maintaining the above configuration. In this embodiment, the optical fibers 21 are arranged in a two-dimensional array with two rows and two columns. The optical fibers 21 may be arranged in a two-dimensional array where the optical fibers 21 (e.g. eight fibers) are arranged along a circular circumference. The optical fibers 21 may be arranged in a one-dimensionally array with one column. When an external form of the optical cable 20 is a cylindrical shape, it is possible to, by two-dimensionally arranging the optical fibers 21 inside the optical cable 20, efficiently accommodate more optical fibers 21 inside of the optical cable 20. Though a configuration of providing nothing between the fiber tube 23 and the cable sheath 24 in the example shown in FIG. 3, one or more electrical signal lines may be provided in the area. In this case, it is possible to make the optical cable 20 a photoelectric composite cable. A metal braid may be provided on an outer circumference of the fiber tube 23.

In the optical cable 20, parts of the optical fibers 21 extend outside from one end 24a of the cable sheath 24, as shown in FIGS. 4 and 6. First extending parts 21a of the optical fibers 21 are located adjacent to the one end 24a. Second extending parts 21b of the optical fibers 21 lead to the first extending parts 21a and extend outside from ends of the first extending parts 21a. The second extending parts 21b are located on fiber tips. In the first extending parts 21a and the second extending parts 21b, the tensile strength fibers 22, the fiber tube 23 and the cable sheath 24 are removed. The optical fibers 21 gradually transition from the two-dimensional array (see FIG. 3) in a part surrounded by the tensile strength fibers 22 to a one-dimensional array (see FIG. 2) different from the two-dimensional array in an area R (transition portions of the optical fibers 21). In the extending parts 21a and 21b of the optical fibers 21, the optical fibers 21 may be displaced, for example, upward or downward from a position in the part surrounded by the tensile strength fibers 22 at the time of the array transition. In this case, a center of gravity in the tip parts of the optical fibers 21 is displaced relative to a center of gravity in the array in the part where the optical fibers 21 are surrounded by the tensile strength fibers 22. A total length of a first extending part 21a and a second extending part 21b is, for example, about 8 to 25 mm. A length of the first extending parts 21a is, for example, about 5 to 15 mm, and a length of the second extending parts 21b is, for example, about 3 to 10 mm. An amount of displacement of the center of gravity of the optical fibers is, for example, about 0.5 to 2.0 mm.

As shown in FIGS. 2 and 4, the holder 30 includes a cylindrical portion 31, a body 32, a pair of projections 33, and a holding portion 34. The cylindrical portion 31 covers the one end 24a of the cable sheath 24 and parts of the first extending parts 21a of the optical fibers 21. The body 32 covers remaining parts of the first extending parts 21a of the optical fibers 21. The pair of projections 33 projects from the body 32 in a tip direction. The holding portion 34 is provided between the paired projections 33, and holds and fixes the first extending parts 21a of the optical fibers 21. The body 32 can hold and fix the first extending parts 21a. The holding portion 34 has a plate-shaped appearance, covers circumferential-direction lower halves of tips of the first extending parts 21a of the optical fibers 21 to hold and fix the optical fibers 21. The holder 30 is made, for example, by injection-molding a resin (e.g. polyamide resin) after arranging the first extending parts 21a of the optical cable 20 described above in a resin injection area of a mold (see FIG. 7) and arranging the second extending parts 21b in a resin non-injection area, and the whole is formed at a time. The cylindrical portion 31 has, for example, a cylindrical shape because it covers the one end 24a of the cable sheath 24, and the body 32 can be, for example, in an appropriate rectangular shape. By providing the cylindrical portion 31, it is possible to certainly fix the holder 30 to the optical cable 20 and protect the optical fibers 21 near the cable sheath 24. The holder 30 can be configured without providing the cylindrical portion 31.

Inside the cylindrical portion 31 and the body 32, the first extending parts 21a are housed and held in the holder 30 in a manner of transitioning from the two-dimensional array on the cable side to the one-dimensional array on the tip side to cause a mutual positional relationship including pitches among the optical fibers 21 to change, as shown in FIGS. 4 and 6. Then, in the holding portion 34 provided on one end of the body 32, end portions 21c of the first extending parts 21a are arranged being lined up to be one-dimensional and held in a manner of being parallel at predetermined pitches as shown in FIG. 5. Since the holding portion 34 holds the first extending parts 21a of two pairs of the optical fibers 21 for transmission and reception in FIG. 5, a pitch between paired optical fibers of each pair is different from a pitch between both pairs in the example of FIG. 5. All of fiber pitches for the first extending parts 21a may be the same. As for the fiber pitches for the optical fibers 21, for example, at the time of arraying the optical fibers 21 in the cable sheath 24, the optical fibers 21 are arranged in a manner of being in contact with one another, and a pitch between centers of optical fibers 21 is about 0.1 to 0.5 mm. At the time of arraying in the first extending parts 21a/the second extending parts 21b, the optical fibers 21 are arranged in a manner of being separate from one another, and the pitch between centers of optical fibers 21 may be about 0.3 to 1.0 mm.

Since the holding portion 34 holds the end portions 21c of the first extending parts 21a adjoining the second extending parts 21b as described above, a mutual positional relationship among the second extending parts 21b are maintained in a manner of being the same state as a mutual positional relationship among the first extending parts 21a in the holding portion 34. That is, the second extending parts 21b are lined up by the holding portion 34 in a manner of being mutually in parallel at predetermined pitches. At the time of the conversion, the optical fibers 21 are pitch-converted to have array pitches wider than array pitches inside the optical cable 20 (see FIG. 6). A length of the end portions 21c held by the holding portion 34 may be, for example, shorter than a projection length of the projections 33 and may be about 1 to 5 mm.

Figure 7:
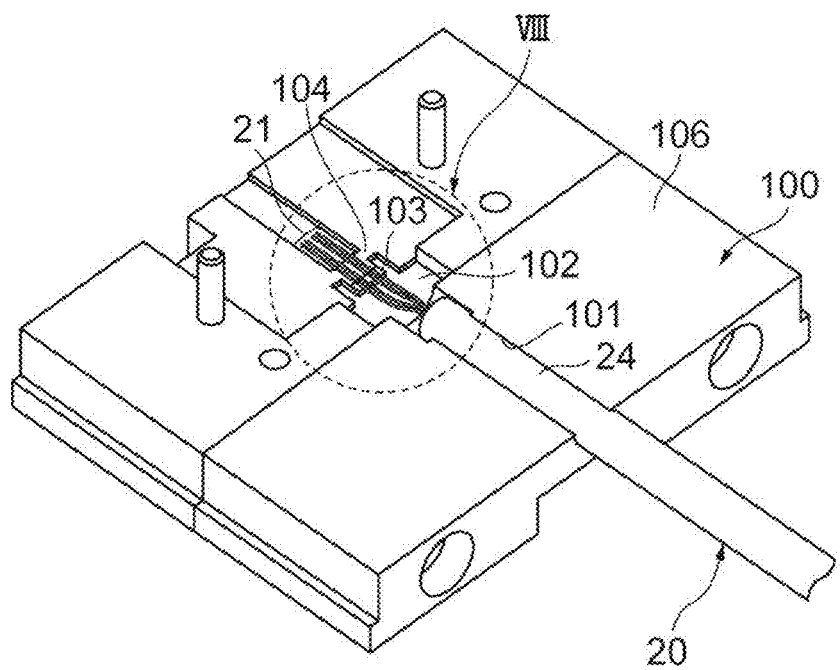
FIG. 7 is a perspective view showing a state of having installed the optical cable on a lower mold for making the optical fiber cable according to the first embodiment.
Figure 8:
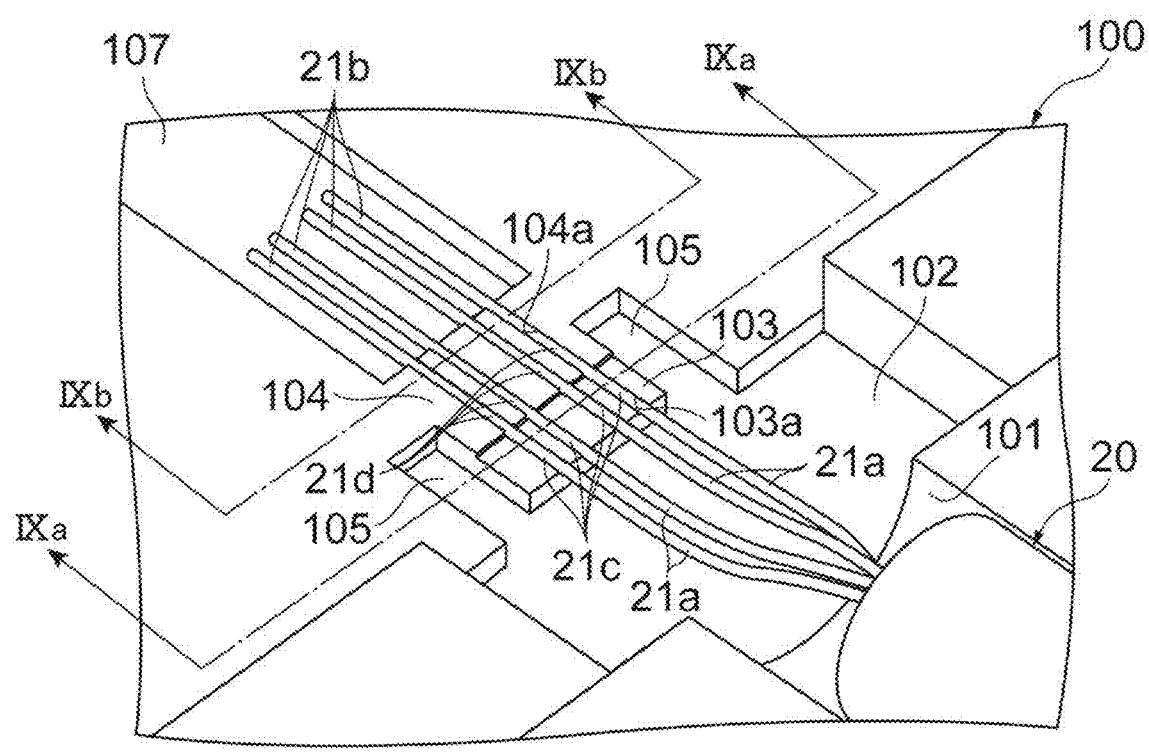
FIG. 8 is a perspective view showing an enlarged VIII portion which is a main part in FIG. 7.
Figure 9A:
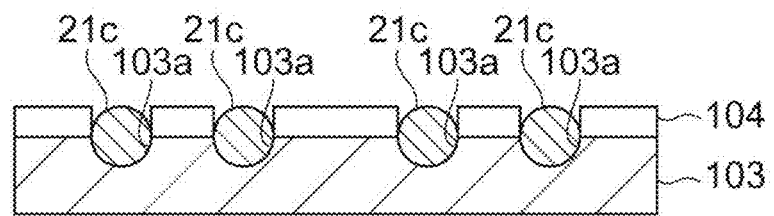
FIG. 9A is a cross-sectional view along a IXa-IXa line in FIG. 8.
Figure 9B:
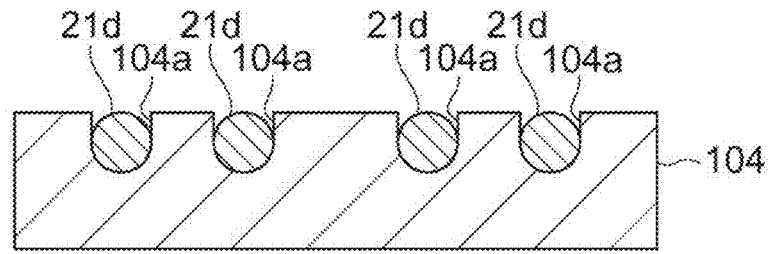
FIG. 9B is a cross-sectional view along a IXb-IXb line in FIG. 8.
Figure 10:
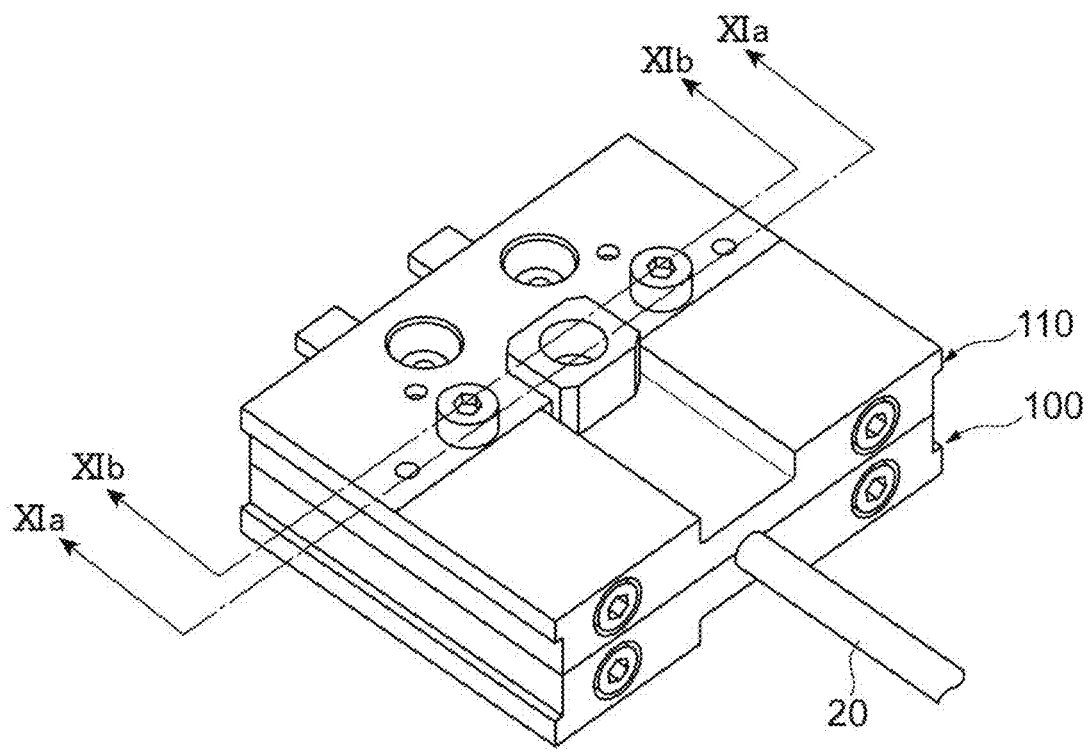
FIG. 10 is a perspective view showing a state of having installed an upper mold on the lower mold shown in FIG. 7 and injected molding resin into an inside thereof.

Next, description will be made on an example of a method for manufacturing the optical fiber cable 10 with reference to FIGS. 7 to 11B. FIG. 7 is a perspective view showing a state of having installed the optical cable 20 on a lower mold for making the optical fiber cable 10. FIG. 8 is a partially enlarged perspective view enlargingly showing a VIII part which is a main part in FIG. 7. FIG. 9A is a cross-sectional view along a IXa-IXa line in FIG. 8, and FIG. 9B is a cross-sectional view along a IXb-IXb line in FIG. 8. FIG. 10 is a perspective view showing a state of having installed an upper mold on the lower mold shown in FIG. 7 and injected molding resin into an inside thereof. FIG. 11A is a cross-sectional view along a XIa-XIa line in FIG. 10, and FIG. 11B is a cross-sectional view along a XIb-XIb line in FIG. 10.

First, the optical cable 20 (see FIG. 3) having the optical fibers 21, the tensile strength fibers 22, the fiber tube 23 and the cable sheath 24 is prepared. At this time, the tensile strength fibers 22, the fiber tube 23 and the cable sheath 24 are removed by a predetermined length on one end side of the optical cable 20 to prepare the optical cable 20 having the first extending parts 21a and the second extending parts 21b. In the optical cable 20, the optical fibers 21 are lined up in a predetermined array, for example, with two rows and two columns inside the cable sheath 24.

Then, as shown in FIGS. 7 and 8, a lower mold 100 on which the optical cable 20 with a part of fibers extending outward is to be placed is prepared. The lower mold 100 is provided with an arrangement portion 101, a void 102, a positioning mechanism 103, and a holding mechanism 104. The arrangement portion 101 is a void for arranging the cable sheath 24 of the optical cable 20. The void 102 corresponds to fiber transition portions (the area R in FIG. 6) where the first extending parts 21a mainly transitions from a two-dimensional array to a one-dimensional array. The positioning mechanism 103 causes the end portions 21c of the first extending parts 21a to be placed on the positioning mechanism 103 in a one-dimensional array state. The holding mechanism 104 holds end portions 21d of the second extending parts 21b adjacent to the first extending parts 21a.

As shown in FIGS. 8 and 9A, the positioning mechanism 103 includes, for example, a plurality of semicircular-shaped grooves 103a. The grooves 103a are formed in a manner of being mutually parallel at predetermined pitches. The grooves 103a may be U grooves, V grooves or trench-structured. A circumferential-direction half of each of the end portions 21c of the first extending parts 21a is held in each groove 103a. As shown in FIGS. 8 and 9B, the holding mechanism 104 includes, for example, a plurality of U-shaped grooves 104a. The grooves 104a are formed in a manner of being mutually parallel at predetermined pitches. The grooves 104a may be V grooves or trench-structured. Each of the end portions 21d of the second extending parts 21b is wholly held in each groove 104a. The pitches for the grooves 103a and an arrangement where the grooves 103a are mutually parallel are the same as the grooves 104a. The lower mold 100 is also provided with a pair of projecting spaces 105 projecting forward from the void 102. The positioning mechanism 103 and the holding mechanism 104 are located between the paired projecting spaces 105. In the example shown in FIG. 9A, a maximum depth of the grooves 103a of the positioning mechanism 103 almost corresponds to a radius of the optical fibers 21. The positioning mechanism 103 is not limited thereto. It is possible to change the maximum depth of the grooves 103a, for example, between half of the radius of the optical fibers 21 and 1.5 times the radius.

Further, an upper mold 110 corresponding to the lower mold 100 is prepared. The upper mold 110 is provided with a reference plane, a plane 114b, and spaces 115. The reference plane corresponds to a reference plane 106 of the lower mold 100. The plane 114b corresponds to a top face 104b (see FIG. 11B) of the holding mechanism 104 of the lower mold 100 and is configured to cover the positioning mechanism 103 and the holding mechanism 104. The spaces 115 corresponds to the projecting spaces 105 of the lower mold 100. The lower mold 100 and the upper mold 110 can be made of, for example, quenched tempered steel.

Then, as shown in FIGS. 7 and 8, the cable sheath 24 of the optical cable 20 is placed in the arrangement portion 101, the end portions 21c of the first extending parts 21a are placed in the positioning mechanism 103, and the end portions 21d of the second extending parts 21b are caused to be held by the holding mechanism 104. By this arrangement, the optical cable 20 is installed on the lower mold 100 in a manner that the first extending parts 21a of the optical fibers 21 transition from a two-dimensional array to a one-dimensional array. At this time, the holding mechanism 104 houses the arranged end portions 21d of the second extending parts 21b inside the grooves 104a almost completely (see FIG. 9B). On the other hands, the positioning mechanism 103 houses the arranged end portions 21c of the first extending parts 21a in a state where upper halves of the end portions 21c are exposed from the grooves 103a (see FIG. 9A).

After the optical cable 20 is installed at a predetermined position on the lower mold 100, the upper mold 110 is installed on the lower mold 100, and both are fixed. At this time, the upper mold 110 is installed in a manner that the plane 114b of the upper mold 110 is located above the positioning mechanism 103 and the holding mechanism 104, and the spaces 115 of the upper mold 110 correspond to the projecting spaces 105.

After installation of the upper mold 110 on the lower mold 100 is completed as shown in FIG. 10, the molten molding resin F is injected into an inside of the lower mold 100 and the upper mold 110 so that a part of the arrangement portion 101 (a tip part), the void 102 and a void adjoining the holding mechanism 104 and sandwiched between the positioning mechanism 103 and the plane 114b are filled with the molten molding resin F (see FIGS. 11A and 11B). After a lapse of a predetermined cooling period, the optical fiber cable 10 having a configuration in which the molten molding resin F covers the first extending parts 21a is taken out from the lower mold 100 and the upper mold 110. By the above, it is possible to make the optical fiber cable 10 shown in FIG. 2. In the optical fiber cable 10, the holding portion 34 determining pitches and an extension direction (being mutually parallel, or the like) of the second extending parts 21b exposed to the outside is formed by molding resin injected between the positioning mechanism 103 and the plane 114b of the upper mold 110 shown in FIG. 11A and is configured to cover almost halves of the optical fibers 21.

Figure 12A:
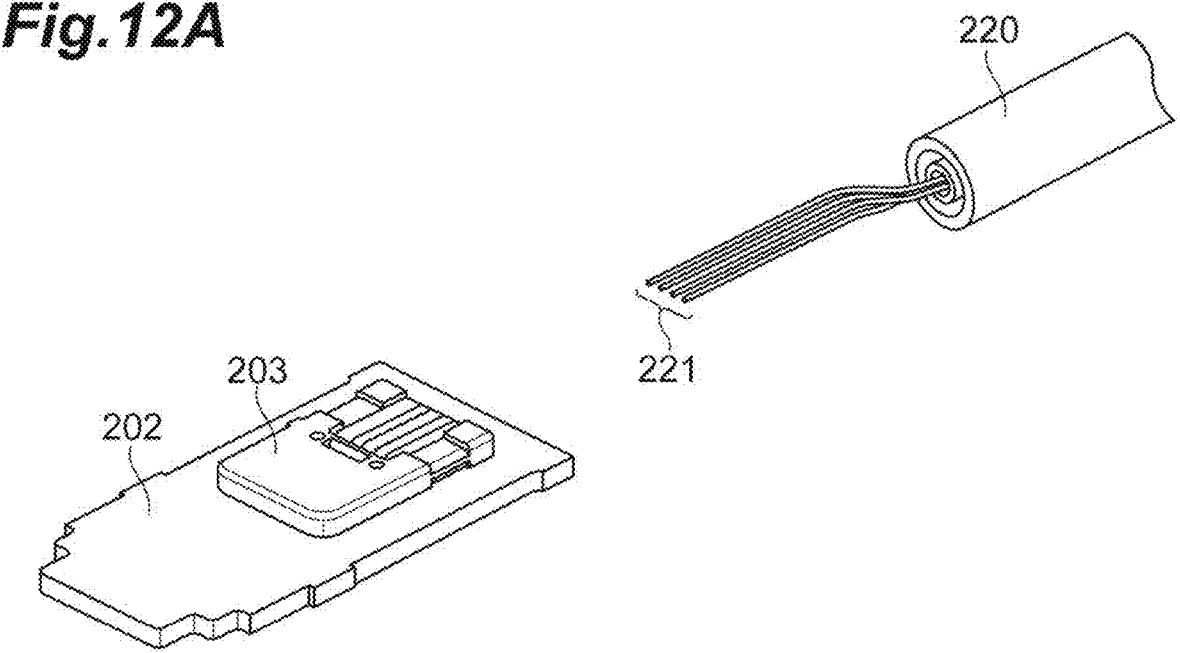
FIG. 12A is a perspective view showing a state before placing each optical fiber of a general optical cable into a groove of the lens member.
Figure 12B:
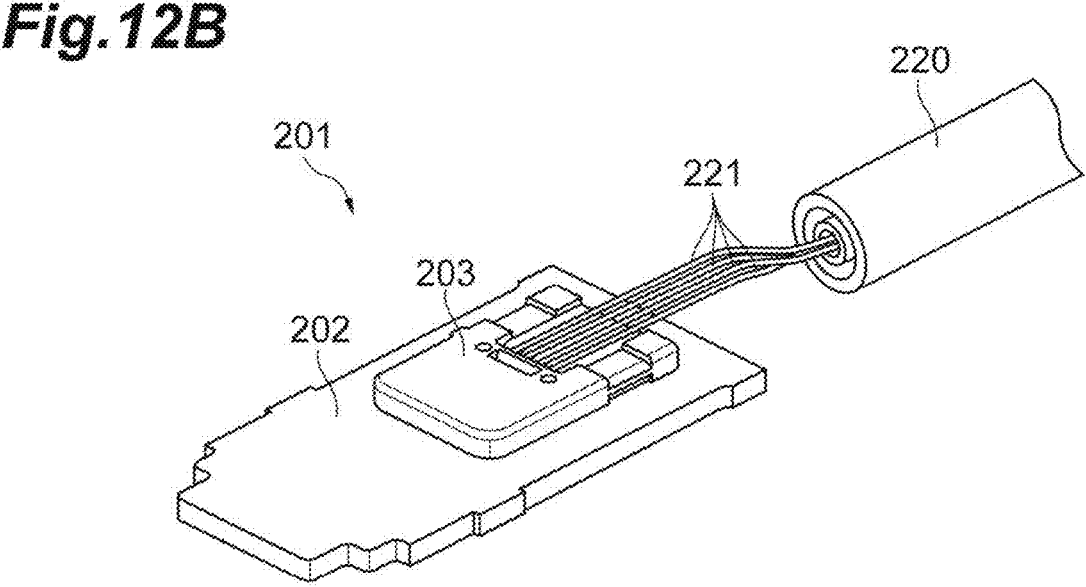
FIG. 12B is a perspective view showing a state after placing each optical fibers of the optical cable into a groove of the lens member.
Figure 13A:
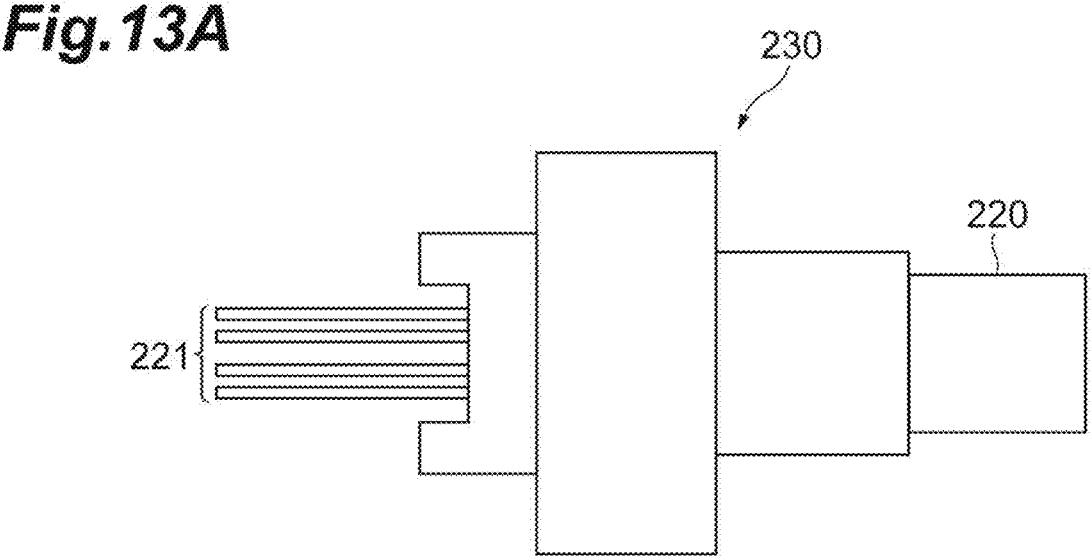
FIG. 13A is a plan view showing an ideal fiber array for installing the optical fibers to the lens member.
Figure 13B:
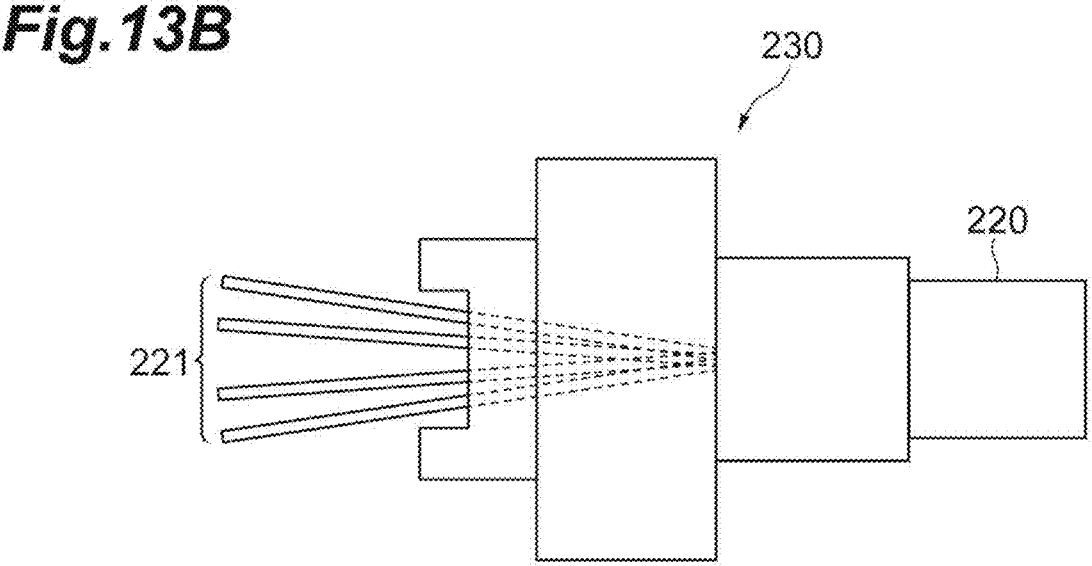
FIG. 13B is a plan view showing a fiber array assumed in the case of having created a fiber array for installing the optical fibers to the lens member by resin molding.

Here, description will be made on action and effects of the optical fiber cable 10 made in the manufacturing method described above with reference to FIGS. 12A, 12B, 13A and 13B. FIG. 12A is a perspective view showing a state before placing each optical fiber of a general optical cable into a groove of a lens member, and FIG. 12B is a perspective view showing a state after placing each optical fiber of the optical cable into a groove of the lens member. FIG. 13A is a plan view showing an ideal fiber array for installing optical fibers to the lens member, and FIG. 13B is a plan view showing a fiber array assumed in the case of having created a fiber array for installing optical fibers to the lens member by resin molding.

In the case of placing an optical cable 220 having a plurality of optical fibers 221 on a lens member 203 arranged on a circuit board 202 as shown in FIGS. 12A and 12B, it is conceivable to arrange extending parts of the optical fibers 221 extending from the optical cable 220 in lined-up grooves formed on the lens member 203 in order. However, an optical fiber 221 is difficult to keep bent in comparison with an electrical signal line having a copper core wire, and, in the first place, it is difficult to place the optical fibers 221 in the grooves on the lens member 203. Further, even if it is successful to install the optical fibers 221 to the grooves on the lens member 203, it may happen that an optical fiber comes out of a groove, or a position of the optical fiber is displaced during a period until the optical fibers 221 are finally fixed with adhesive after being installed to the grooves. If the optical fiber is fixed with its position displaced from a predetermined position as described above, optical coupling efficiency between an optical device (light receiving elements or light emitting elements) and the optical fibers is not stable. On the other hand, if it is attempted to perform line arrangement by forcingly bending an optical fiber, the optical fiber is excessively stressed and may be broken.

Therefore, it is conceivable to hold and fix the extending parts of the optical fibers 221 of the optical cable 220 with a resin-molded article 230 as shown in FIG. 13A to set the pitches, the extension direction (being mutually parallel) and the like of the optical fibers 221 to desired values. However, if the optical fibers 221 are placed on a mold as they are to form the resin-molded article 230, there is a strong possibility that the optical fibers 221 radially spread as shown in FIG. 13B because the optical fibers 221 are not fixed in a molding process.

In comparison, the optical fiber cable 10 according to this embodiment is provided with the holder 30 housing and holding the first extending parts 21a of the optical fibers 21 inside. The holding portion 34 of the holder 30 is configured to hold the first extending parts 21a of the optical fibers 21 in a manner that a mutual positional relationship (pitches and an extension direction) among the second extending parts 21b leading to the first extending parts 21a keeps the same state as a mutual positional relationship among the first extending parts 21a in the holding portion 34. Since it is possible to, by the configuration of the holding portion 34 to hold the first extending parts 21a as described above, determine the mutual positional relationship among the tip parts (the second extending parts 21b) of the optical fibers 21 in advance so that a desired relationship can be obtained, it is possible to, at the time of attaching the tip part of each optical fiber 21 to other member (the lens member and the like), easily perform lined-up arrangement of the optical fibers 21. As a result, it is possible to stabilize optical coupling efficiency between each optical fiber 21 and the other member (the optical device, the lens member and the like). Further, since it is possible to determine the mutual positional relationship among the optical fibers 21 (the second extending parts 21b) in advance by the holder 30, it is also possible to easily realize automation of work of attaching the optical fiber cable 10 to other parts.

In the optical fiber cable 10, the holding portion 34 holds the first extending parts 21a in a manner that the second extending parts 21b are mutually parallel. A member to which each optical fiber 21 of the optical fiber cable 10 is to be attached (e.g. the lens member 3) is often designed so that areas (e.g. the grooves 3a) to which optical fibers 21 are attached are mutually parallel. By the second extending parts 21b being held in a manner of being mutually parallel, attachment to such a member can be easily realized.

In the optical fiber cable 10, a fiber array in an area where the optical fibers 21 is housed inside the cable sheath 24 is a two-dimensional array. The optical fiber cable 10 makes it possible to cause the optical fibers 21 arranged in the optical cable 20 to be arranged more equally and eliminate necessity of making a diameter of the optical cable 20 larger than necessary. Thus, the optical fiber cable 10 can be downsized.

In the optical fiber cable 10, an array of tip areas of the optical fibers 21 is a one-dimensional array. Thus, it is possible to continuously form fiber attaching areas on a member to which the optical fibers 21 are to be attached (e.g. the lens member) in one direction, and it becomes possible to easily perform the processing. Further, since it is also possible to make the attaching areas thin, the optical connector cable 1 can be thin.

In the optical fiber cable 10, a fiber-to-fiber pitch in an array of the tip areas of the optical fibers 21 is wider than a fiber-to-fiber pitch in an array inside the cable sheath 24. In this case, it is possible to give degrees of freedom to designs of circuits of the circuit board 2 and the lens member 3.

In the optical fiber cable 10, a center of gravity of the optical fibers 21 inside the cable sheath 24 may be displaced from a center of gravity in the array of the tip areas of the optical fibers 21 in an extension direction of the optical fibers 21. If the center of gravity of the optical fibers 21 in the array inside the cable sheath 24 is caused to correspond to the center of gravity in the array of the distal end areas of the optical fibers 21 in the extension direction of the optical fibers 21, it is possible to easily cause the optical fibers 21 to transition from one array to the other array. On the other hand, a member on which the optical fibers 21 is to be placed (for example, the lens member 3) is often formed on the circuit board 2, and, if the configuration of causing one center of gravity and the other center of gravity to correspond is adopted in this case, a positional relationship between the circuit board 2 and the optical cable 20 is vertically displaced. Thus, the configuration may be imbalanced, or thinning of parts may be hindered. Therefore, by adopting the configuration described above, it becomes possible to more easily realize attachment to such a member.

In the optical fiber cable 10, the holding portion 34 covers partial outer circumferences of parts where the first extending parts 21a are in a one-dimensional array. In this case, it is possible to visually confirm a mutual positional relationship among the first extending parts 21a and easily judge quality of an optical fiber cable.

In the optical fiber cable 10, the holder 30 has the pair of projections 33 for positioning the optical fiber cable 10 relative to other member (the lens member 3), and the pair of projections 33 project from one end of the holder 30 along a direction from the first extending parts 21a toward the second extending parts 21b. This optical fiber cable 10 can realize positioning to other member by simple means.

In the optical fiber cable 10, the holder 30 is a resin molded member and is in close contact with the optical fibers 21 in the cylindrical portion 31, the body 32 and the holding portion 34. By the close fixation, the optical fiber cable 10 fixes the optical fibers 21 in the cylindrical portion 31, the body 32 and the holding portion 34 more certainly and prevents the positional relationship among the optical fibers 21 from varying with time or the fixation of the optical fibers 21 from being released by an external impact.

Further, the optical connector cable 1 includes the circuit board 2, the photoelectric conversion device 4 arranged on the circuit board 2, the optical fiber cable 10, and the lens member 3 configured to place the second extending parts 21b on the lens member 3 and optically coupling the optical fibers 21 with the photoelectric conversion device 4. The optical connector cable 1 can stabilize the optical coupling efficiency between each optical fiber 21 and the lens member 3 or the photoelectric conversion device 4. Further, it is also possible to easily realize automation of work of attaching the optical fiber cable 10 to the lens member 3 by the optical connector cable 1.

Second Embodiment

Figure 14:
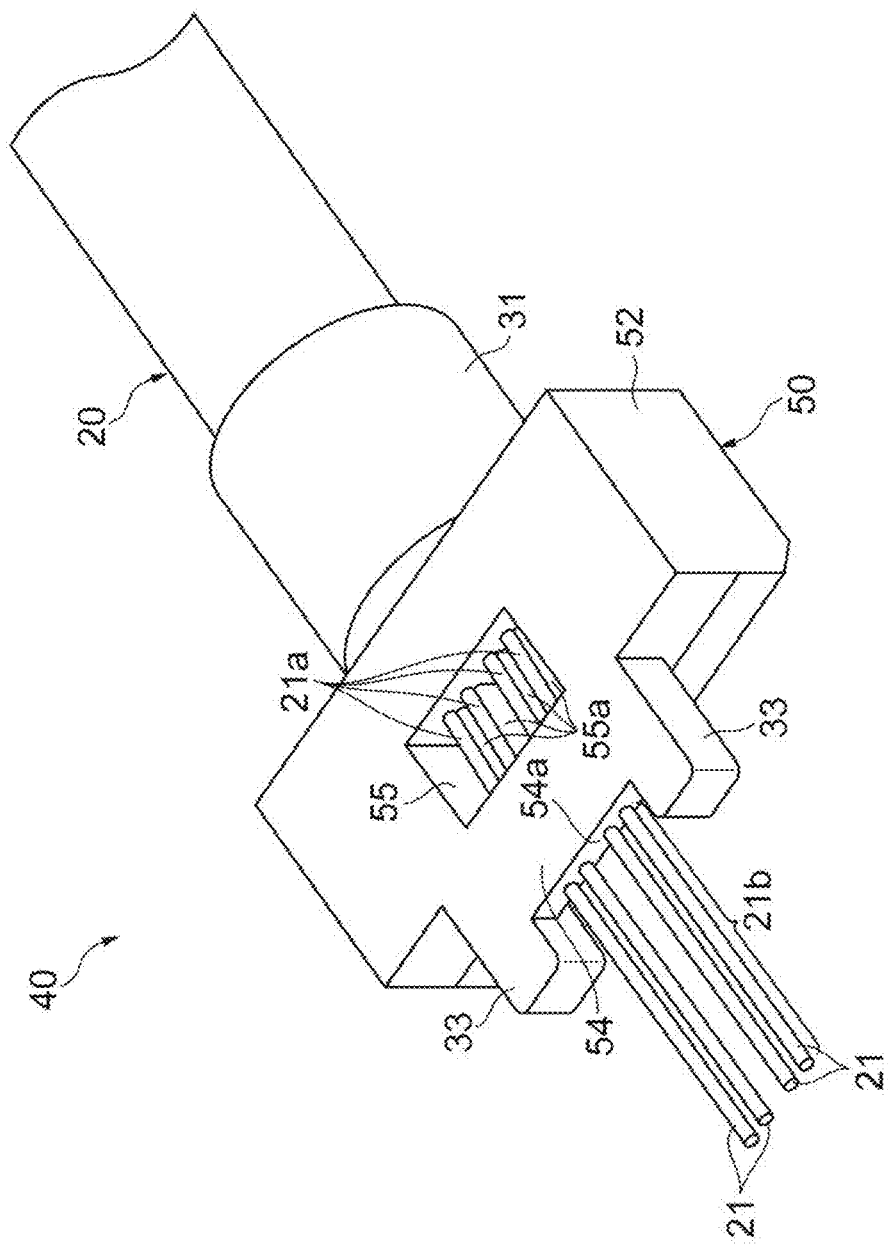
FIG. 14 is a perspective view showing an optical fiber cable according to a second embodiment.
Figure 15:
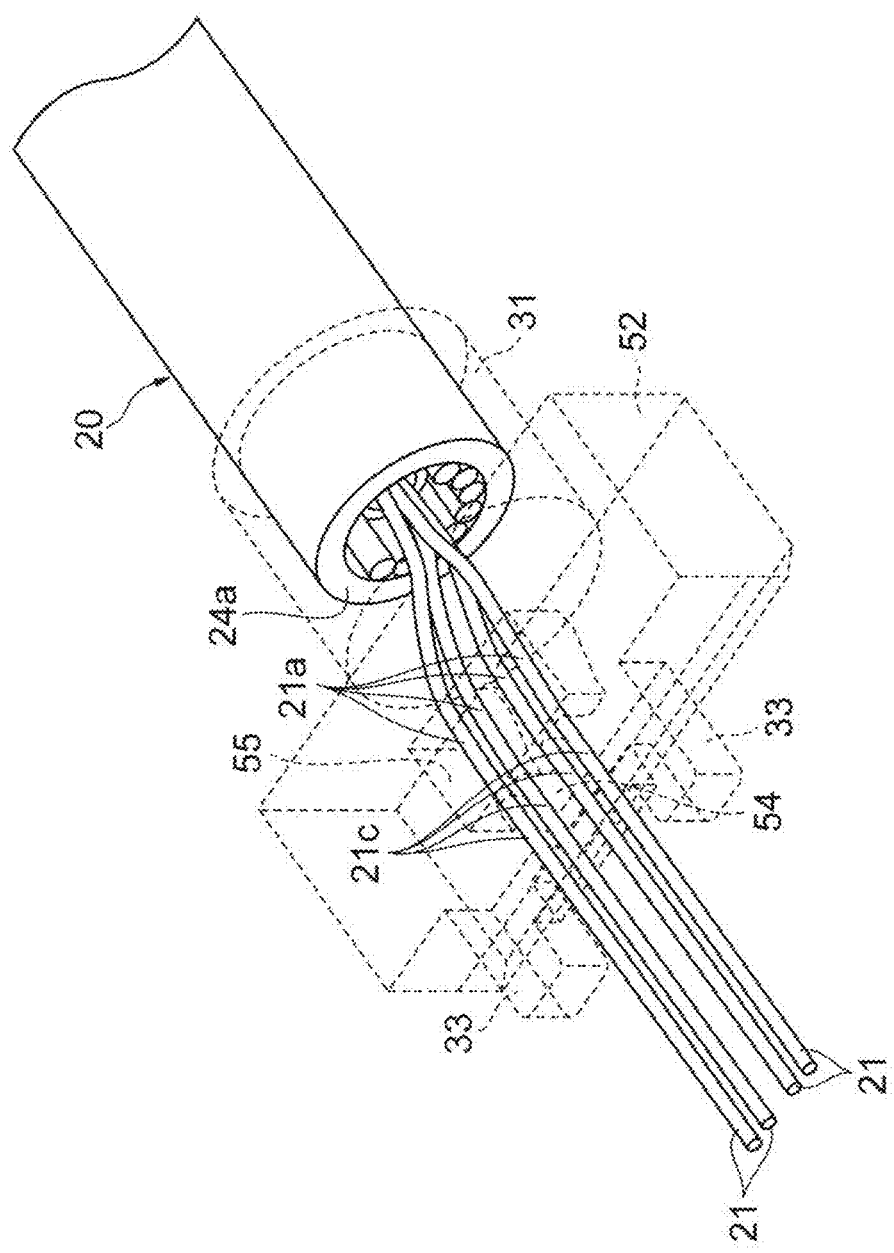
FIG. 15 is a perspective view indicating a holder by dotted lines in the optical fiber cable according to the second embodiment.

Next, an optical fiber cable 40 according to a second embodiment will be described with reference to FIGS. 14 and 15. FIG. 14 is a perspective view showing an optical fiber cable 40. FIG. 15 is a perspective view indicating a holder by dotted lines in the optical fiber cable 40. The optical fiber cable 40 can be used similarly to the optical fiber cable 10 according to the first embodiment and can be attached to the circuit board 2 or the lens member 3 shown in FIGS. 1A and 1B to configure an optical connector cable. In the description below, description will be made on points different from the optical fiber cable 10. As for common points, there may be a case where description thereof is omitted.

As shown in FIG. 14, the optical fiber cable 40 includes the optical cable 20 and a holder 50. The optical fibers 21 of the optical cable 20 include the first extending parts 21a extending from the one end 24a of the cable sheath 24, and the second extending parts 21b leading to the first extending parts 21a, extending from the first extending part 21a and located on the fiber tip side.

As shown in FIGS. 14 and 15, the holder 50 has the cylindrical portion 31, a body 52, the pair of projections 33, a holding portion 54, and a positioning area 55. The cylindrical portion 31 covers parts of the first extending parts 21a. The body 52 covers remaining parts of the first extending parts 21a. The pair of projections 33 projects from the body 52 in the tip direction. The holding portion 54 holds and fixes the first extending parts 21a. The positioning area 55 positions the first extending parts 21a. The holding portion 54 covers the all of the tips of the first extending parts 21a to hold and fix the optical fibers 21. The holder 50 may be made by performing injection molding similarly to the holder 30, and the whole can be formed at a time.

Inside the cylindrical portion 31 and the body 52 of the holder 50, the first extending parts 21a are housed and held in the holder 50 in a manner of transitioning from the two-dimensional array on the cable side to the one-dimensional array on the tip side to cause a mutual positional relationship including pitches among the optical fibers 21 to change as shown in FIG. 15 similarly to the first embodiment. In the holding portion 54 provided on one end of the body 52, the end portions 21c of the first extending parts 21a are arranged being lined up to be one-dimensional and held in a manner of being parallel at predetermined pitches as shown in FIG. 15. In the positioning area 55 of the holder 50, each pitch and an extension direction of the first extending parts 21a are positioned by a manufacturing method to be described later, and the end portions 21c of the positioned first extending parts 21a are fixed by the holding portion 54. In the positioning area 55, parts of the first extending parts 21a of the optical fibers 21 are exposed to the outside, and the fiber parts are arranged on pedestal portions 55a formed in a projecting shape. The exposed portions of the first extending parts 21a in the opening of the area 55 may be mutually parallel.

Since the holding portion 54 holds the end portions 21c of the first extending parts 21a adjoining the second extending parts 21b as described above, a mutual positional relationship among the second extending parts 21b are maintained in a manner of being the same state as a mutual positional relationship among the first extending parts 21a in the holding portion 54. That is, the second extending parts 21b are lined up by the holding portion 54 in a manner of being mutually in parallel at predetermined pitches. Since the holding portion 54 is provided inside the body 52 in the second embodiment, a boundary between the first extending parts 21a and second extending parts 21b corresponds to a face 54a provided between the projections 33.

Figure 16:
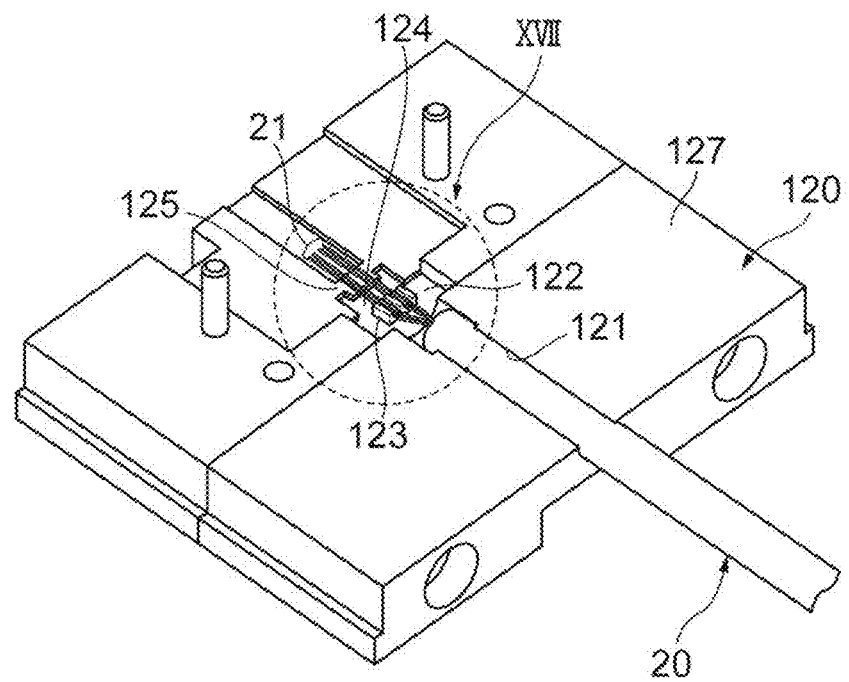
FIG. 16 is a perspective view showing a state of having installed an optical cable on a lower mold for making the optical fiber cable according to the second embodiment.
Figure 17:
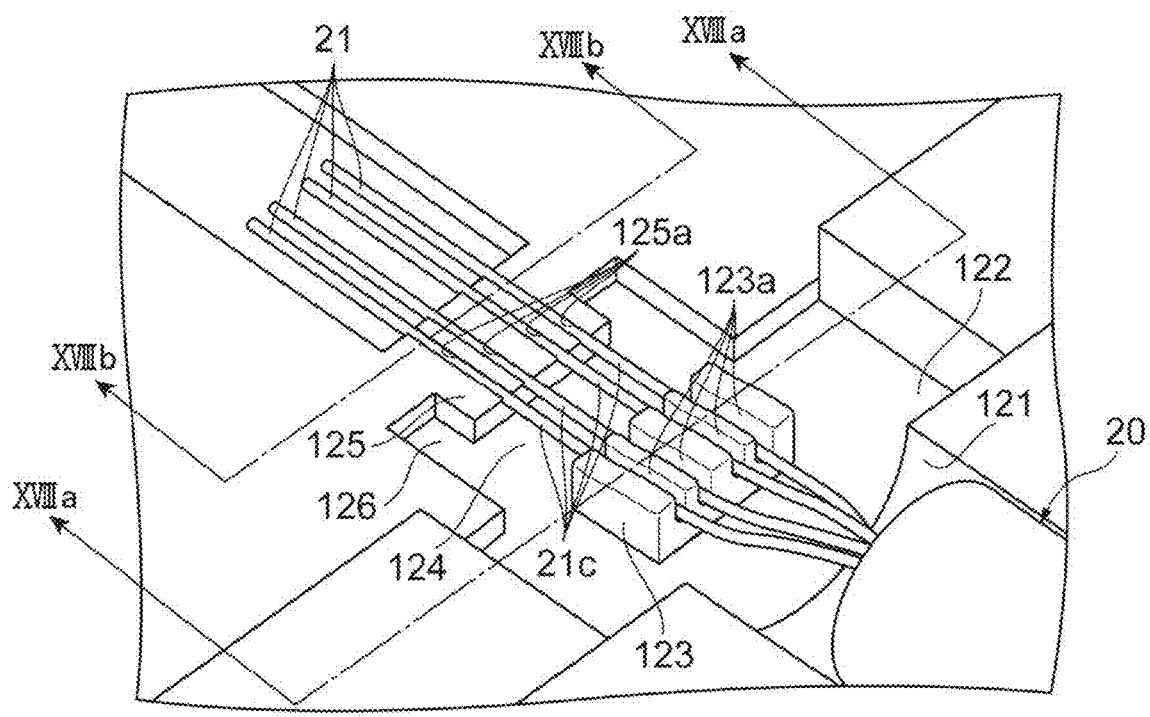
FIG. 17 is a perspective view showing an enlarged XVII portion which is a main part in FIG. 16.
Figure 18A:
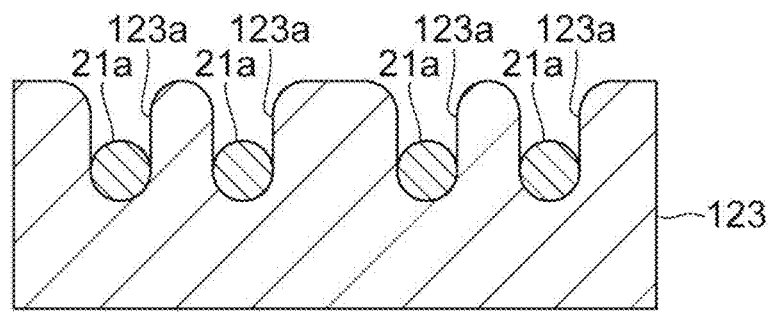
FIG. 18A is a cross-sectional view along a XVIIIa-XVIIIa line in FIG. 17.
Figure 18B:
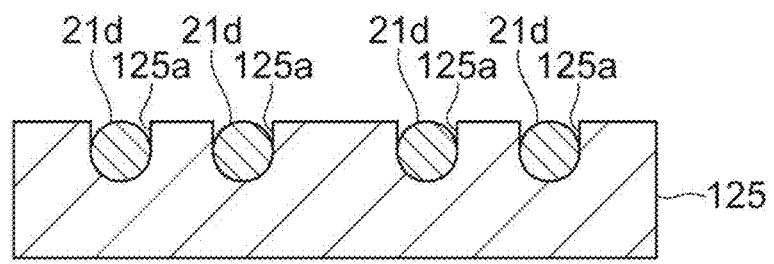
FIG. 18B is a cross-sectional view along a XVIIIb-XVIIIb line in FIG. 17.
Figure 19:
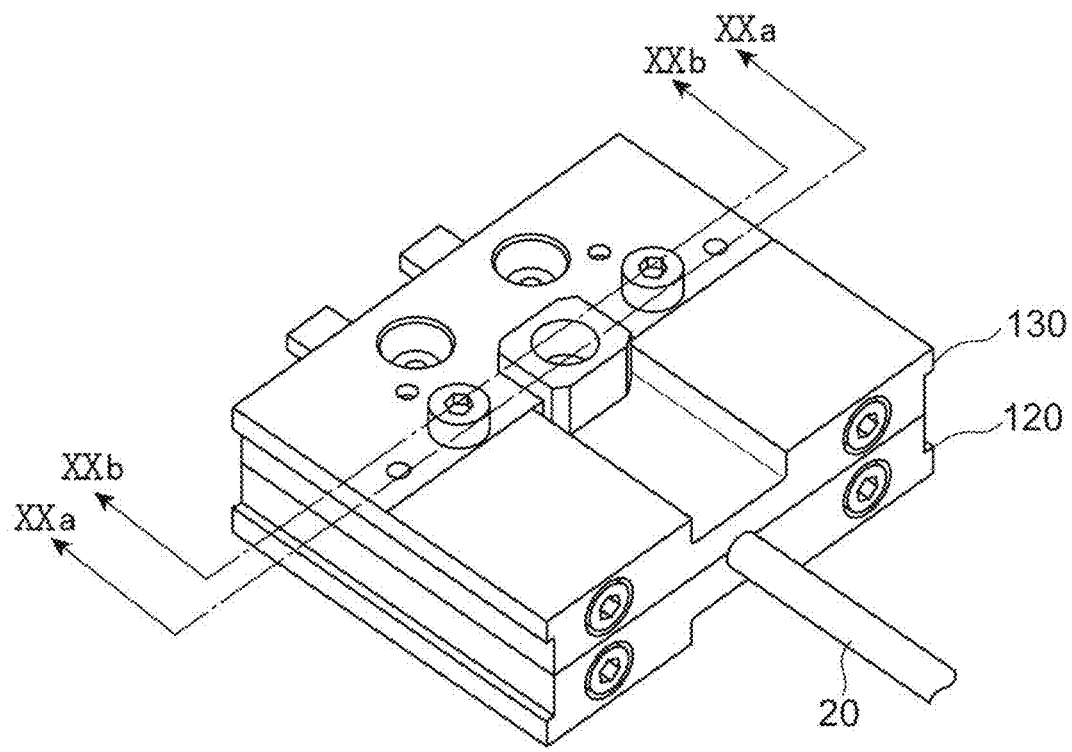
FIG. 19 is a perspective view showing a state of having installed an upper mold on the lower mold shown in FIG. 16 and injected molding resin into the molds.
Figure 20A:
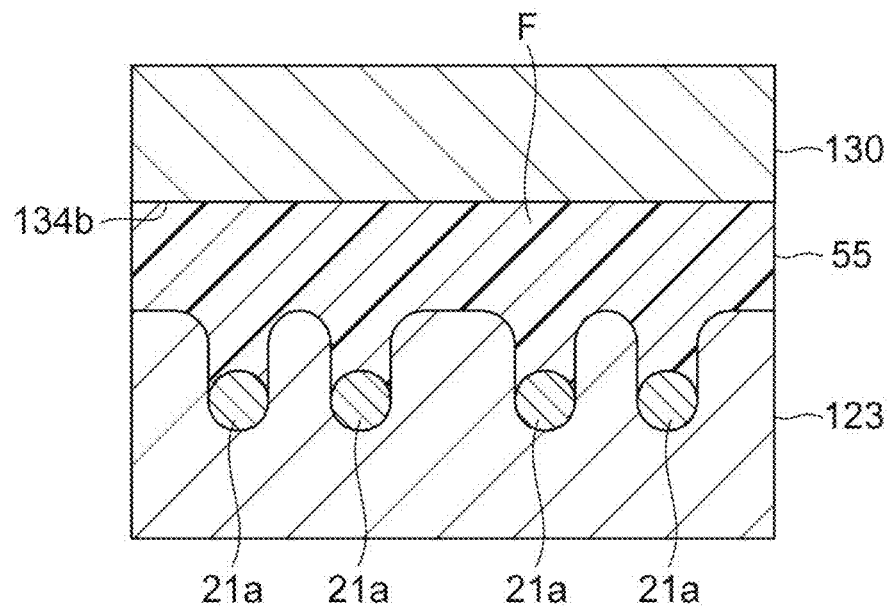
FIG. 20A is a cross-sectional view along a XXa-XXa line in FIG. 19.
Figure 20B:
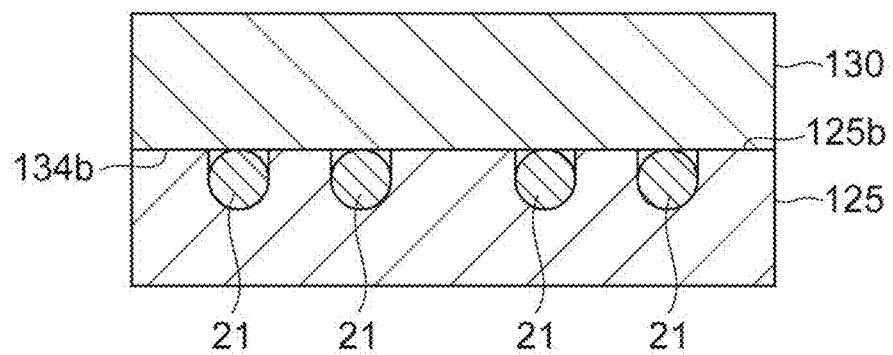
FIG. 20B is a cross-sectional view along a XXb-XXb line in FIG. 19.

Next, description will be made on an example of a method for manufacturing the optical fiber cable 40 with reference to FIGS. 16 to 20B. FIG. 16 is a perspective view showing a state of having installed an optical cable on a lower mold for making the optical fiber cable according to the second embodiment. FIG. 17 is a partially enlarged perspective view enlargingly showing a XVII part which is a main part in FIG. 16. FIG. 18A is a cross-sectional view along a XVIIIa-XVIIIa line in FIG. 17, and FIG. 18B is a cross-sectional view along a XVIIIb-XVIIIb line in FIG. 17. FIG. 19 is a perspective view showing a state of having installed an upper mold on the lower mold shown in FIG. 16 and injected molding resin into the molds. FIG. 20A is a cross-sectional view along a XXa-XXa line in FIG. 19, and FIG. 20B is a cross-sectional view along a XXb-XXb line in FIG. 19.

First, the optical cable 20 (see FIG. 3) having the optical fibers 21, the tensile strength fibers 22, the fiber tube 23 and the cable sheath 24 is prepared. At this time, the tensile strength fibers 22, the fiber tube 23 and the cable sheath 24 are removed by a predetermined length on one end side of the optical cable 20 to prepare the optical cable 20 having the first extending parts 21a and the second extending parts 21b. In the optical cable 20, the optical fibers 21 are lined up in a predetermined array, for example, with two rows and two columns inside the cable sheath 24.

Then, as shown in FIGS. 16 and 17, a lower mold 120 on which the optical cable 20 with a part of fibers extending is to be placed is prepared. The lower mold 100 is provided with an arrangement portion 121, a void 122, a positioning mechanism 123, a filling void 124, and a holding mechanism 125. The arrangement portion 121 is a void for arranging the cable sheath 24. The void 122 corresponds to a fiber transition portions (the area R in FIG. 6) where the first extending parts 21a mainly transitions from a two-dimensional array to a one-dimensional array. The positioning mechanism 123 positions the first extending parts 21a to be in a one-dimensional array state. The filling void 124 is a space where the end portions 21c of the first extending parts 21a in the one-dimensional array state are arranged. The holding mechanism 125 holds the end portions 21d of the second extending parts 21b adjacent to the first extending parts 21a.

As shown in FIGS. 17 and 18A, the positioning mechanism 123 includes, for example, a plurality of elongated-hole-shaped grooves 123a. The grooves 123a are formed in a manner of being mutually parallel at predetermined pitches. Each of the first extending part 21a is positioned, the whole of the first extending part being held in a groove 123a. As shown in FIGS. 17 and 18B, the holding mechanism 125 includes, for example, a plurality of U-shaped grooves 125a. The grooves 125a are formed in a manner of being mutually parallel at predetermined pitches. The grooves 125a may be V grooves or trench-structured. Each of the end portions 21d of the second extending parts 21b is wholly held in each groove 125a. The pitches for the grooves 123a and an arrangement where the grooves 123a are mutually parallel are the same as the grooves 125a. Between the positioning mechanism 123 and the holding mechanism 125, the end portions 21c of the first extending parts 21a are arranged in a suspended state in the filling void 124 in a manner that each pitch and an extension direction determined by the positioning mechanism 123 and the holding mechanism 125 are obtained. The lower mold 120 is also provided with a pair of projecting spaces 126 projecting forward from the filling void 124. In the example shown in FIG. 18A, a maximum depth of the grooves 123a of the positioning mechanism 123 is almost two times a diameter of the optical fibers 21. The positioning mechanism 123 is not limited thereto. It is possible to change the maximum depth of the grooves 123a, for example, between 1.2 times and three times the diameter of the optical fibers 21.

Further, an upper mold 130 corresponding to the lower mold 120 is prepared. The upper mold 130 is provided with a reference plane, a plane 134b, and spaces. The reference plane corresponds to a reference plane 127 of the lower mold 120. The plane 134b corresponds to a top surface 125b (see FIG. 20B) of the holding mechanism 125 of the lower mold 120 and is configured to cover the positioning mechanism 123 and the holding mechanism 125. The spaces corresponds to the projecting spaces 126 of the lower mold 120.

Then, as shown in FIGS. 16 and 17, the cable sheath 24 of the optical cable 20 is placed in the arrangement portion 121, parts on a near side of the end portions 21c of the first extending parts 21a are placed in the positioning mechanism 123, and the end portions 21d of the second extending parts 21b are caused to be held by the holding mechanism 125. By the arrangement, the optical cable 20 is installed on the lower mold 120 in a manner that the first extending parts 21a transition from a two-dimensional array to a one-dimensional array. At this time, in the holding mechanism 125, the arranged end portions 21d of the second extending parts 21b are housed inside the grooves 125a almost completely (see FIG. 18B). Further, in the positioning mechanism 123, the arranged near-side parts of the end portions 21c of the first extending parts 21a are housed inside the grooves 123a almost completely (see FIG. 18A). On the other hand, the end portions 21c of the first extending parts 21a between both are adapted to be completely exposed in the filling void 124 (see FIG. 17). In the second embodiment, since the positioning mechanism 123 is arranged closer to the one end 24a of the cable sheath 24 in comparison with the first embodiment, it is possible to realize lined-up arrangement of optical fibers more certainly even when the radius of bending curvature of the optical fibers is small.

Then, when the optical cable 20 is installed at a predetermined position on the lower mold 120, the upper mold 130 is installed on the lower mold 120. At this time, the upper mold 130 is installed in a manner that the plane 134b of the upper mold 130 is located above the positioning mechanism 123 and the holding mechanism 125.

After installation of the upper mold 130 onto the lower mold 120 is completed as shown in FIG. 19, the molten molding resin F is injected into an inside of the lower mold 120 and the upper mold 130. By the injection, a part of the arrangement portion 121 (a tip part), the void 122, areas of the grooves 123a of the positioning mechanism 123 where the fibers are not arranged (see FIG. 20A), and the filling void 124 adjoining the holding mechanism 125 and sandwiched by the plane 134b, with the end portions 21c of the first extending parts 21a arranged therein (see FIGS. 20A and 20B). Then, after a lapse of a predetermined cooling period, the optical fiber cable 40 having a configuration in which the molten molding resin F covers the first extending parts 21a is taken out from the lower mold 120 and the upper mold 130. By the above, it is possible to make the optical fiber cable 40 shown in FIG. 14. In the optical fiber cable 40, the holding portion 54 determining pitches and an extension direction (being mutually parallel) of the second extending parts 21b exposed to the outside is formed by molding resin injected into the filling void 124 between the positioning mechanism 123 and the holding mechanism 125 shown in FIG. 17, and the plane 134b of the upper mold 130, and a degree of parallelism among optical fibers is determined more certainly.

As described above, the optical fiber cable 40 is provided with the holder 50 housing and holding the first extending parts 21a of the optical fibers 21 inside similarly to the optical fiber cable 10 according to the first embodiment. The holding portion 54 is configured to hold the first extending parts 21a in a manner that a mutual positional relationship (pitches and an extension direction) among the second extending parts 21b leading to the first extending parts 21a keeps the same state as a mutual positional relationship among the first extending parts 21a in the holding portion 54. Since it is possible to, by the configuration of the holding portion 54 to hold the first extending parts 21a as described above, determine the mutual positional relationship among the tip parts (the second extending parts 21b) of the optical fibers 21 in advance so that a desired relationship can be obtained, it is possible to, at the time of attaching a tip part of each optical fiber 21 to other member (the lens member), easily perform lined-up arrangement of the optical fibers 21. As a result, the optical fiber cable 40 makes it possible to stabilize optical coupling efficiency between each optical fiber 21 and other member (the lens member 3, the optical transmission/reception device or the like). Further, since it is possible to determine the mutual positional relationship among the optical fibers 21 (the second extending parts 21b) in advance by the holder 50, it is also possible to easily realize automation of work of attaching the optical fiber cable 40 to other part.

In the optical fiber cable 40, the holding portion 54 wholly covers the fiber outer circumferences of the parts where the first extending parts 21a are in a one-dimensional array. Since the whole fiber outer circumferences are covered, the optical fiber cable 40 can prevent the first extending parts 21a from coming out of the holding portion 54 more certainly and maintain the mutual positional relationship among the second extending parts 21b over a long time.

In the optical fiber cable 40, the holding portion 54 is located closer to the one end 24a of the optical cable 20 and is provided with the positioning area 55 on the near side of the holding portion 54. Thus, it becomes possible for the optical fiber cable 40 to certainly perform development and lined-up arrangement of the optical fibers 21 from a two-dimensional array to a one-dimensional array by the positioning area 55 while shortening the length of the holder 50 to attempt downsizing.

In the optical fiber cable 40, the body 52 is provided with the positioning area 55 (an opening) where parts of the first extending parts 21a are exposed, in an area close to the holding portion 54. In this case, it is possible to easily visually confirm a state of the optical fibers (for example, pitches and an extension direction which are a positional relationship) in the body 52 and can easily judge quality of the optical fiber cable 40. Since, as for components common to the optical fiber cable 10, it is apparent to those skilled in the art that the optical fiber cable 40 has similar action and effects, description on others will be omitted.

Optical fiber cables and optical connector cables provided with the optical fiber cables according to the embodiments have been described above. The present invention, however, is not limited to the embodiments, and it is possible to apply various modifications. For example, though description has been made on an example in which optical fibers are exposed at one end of the optical cable 20 in the above embodiments, a configuration in which optical fibers are similarly exposed on both ends of the optical cable 20, and both ends are provided with the holders 30 and 50. Further, though description has been made with the optical cable 20 having four optical fibers as an example in the above embodiments, the number of optical fibers included in an optical cable is not limited to four, and an optical cable having eight or sixteen optical fibers may be adopted.

What is claimed is:

1. An optical fiber cable comprising:
an optical cable including a plurality of optical fibers and a sheath surrounding the plurality of optical fibers, the plurality of optical fibers being arranged in a first array within the sheath, wherein the plurality of optical fibers have first extending parts that respectively extend outside from one end of the sheath, and second extending parts that respectively extend from one ends of the first extending parts to the tips of the optical fibers; and
a holder arranged in the vicinity of the one end of the sheath, the holder comprising a first portion that houses therein transition portions of the first extending parts where the first extending parts transitions from the first array to a second array different from the first array and that is in contact with the transition portions, and a second portion that holds parts of the first extending parts in the second array,
wherein the second portion is configured to hold the first extending parts in a manner that a mutual positional relationship among the second extending parts keeps the same state as a mutual positional relationship among the first extending parts at the second portion,
wherein the holder is a resin molded member,
wherein the first extending parts are fixed by the molded resin at the second portion, and
wherein a center of gravity of the plurality of optical fibers in the second array is displaced relative to a center of gravity in the first array in an extension direction of the plurality of optical fibers.

2. The optical fiber cable according to claim 1, wherein the second portion holds the first extending parts in a manner that the second extending parts are mutually parallel.

3. The optical fiber cable according to claim 1, wherein the first array is a two-dimensional array.

4. The optical fiber cable according to claim 1, wherein the second array is a one-dimensional array.

5. The optical fiber cable according to claim 1, wherein a fiber-to-fiber pitch of the plurality of optical fibers in the second array is wider than a fiber-to-fiber pitch in the first array.

6. The optical fiber cable according to claim 1, wherein the second portion covers partial outer circumferences of the first extending parts in the second array.

7. The optical fiber cable according to claim 1, wherein the second portion covers whole outer circumferences of the first extending parts in the second array.

8. The optical fiber cable according to claim 1, wherein the first portion is provided with an opening in an area close to the second portion, at least parts of the first extending parts being exposed in the opening.

9. The optical fiber cable according to claim 1, wherein the holder further comprises a positioning mechanism configured to position the optical fiber cable relative to other member, the positioning mechanism projecting from one end of the holder along an extension direction of the plurality of optical fibers.

10. The optical fiber cable according to claim 1, wherein the holder is in close contact with the plurality of optical fibers in the second portion.

11. The optical fiber cable according to claim 1, wherein the second portion is in contact with the first extending parts in the second array.

12. The optical fiber cable according to claim 1, wherein tip parts of the optical fibers are exposed outside of the holder.

13. The optical fiber cable according to claim 12, wherein the exposed tip parts of the optical fibers are mutually parallel.

14. The optical fiber cable according to claim 1, wherein outside of the transition portions and areas between the respective transition portions are filled with a resin of the holder to fix the transition portions to the first portion.

15. The optical fiber cable according to claim 1, wherein outside of the first extending parts in the second array and areas between the respective first extending parts in the second array are filled with a resin of the holder to fix the first extending parts to the second portion.

16. The optical fiber cable according to claim 1, wherein the holder fixes the optical fibers thereto to prevent free movement of the transition portions of the optical fibers.

17. The optical fiber cable according to claim 1, wherein the second extending parts of the optical fibers are exposed outside of the holder and each length of the second extending parts is 3 mm to 10 mm.

18. The optical fiber cable according to claim 1, wherein a pitch of the plurality of optical fibers in an extension direction of the plurality of optical fibers changes between the first array and the second array.

19. An optical connector cable comprising:
a circuit board;
a photoelectric conversion device arranged on the circuit board;
the optical fiber cable according to claim 1; and
a lens member configured to install the second extending parts thereon, the lens member optically coupling the plurality of the optical fibers with the photoelectric conversion device.

* * * * *